United States Patent [19]

Hirani et al.

[11] Patent Number: 5,892,853
[45] Date of Patent: Apr. 6, 1999

[54] METHODS, APPARATUS AND PROGRAM STORAGE DEVICE FOR REMOVING SCRATCH OR WIRE NOISE, AND RECORDING MEDIA THEREFOR

[75] Inventors: Anil Hirani, Tokyo; Takashi Totsuka, Chiba, both of Japan

[73] Assignee: Sony Corporation, Tokyo, Japan

[21] Appl. No.: 899,349

[22] Filed: Jul. 23, 1997

[30]     Foreign Application Priority Data

Aug. 2, 1996  [JP]  Japan ..................................... 8-204776

[51] Int. Cl.[6] .................................................. H04N 1/38
[52] U.S. Cl. ........................... 382/280; 382/204; 348/607
[58] Field of Search ................................... 348/616, 617;
              382/275, 280, 282, 283, 257; 364/726.01

[56]                 References Cited

U.S. PATENT DOCUMENTS

| 4,814,755 | 3/1989 | Johnson et al. | 340/709 |
|---|---|---|---|
| 4,868,884 | 9/1989 | Miyazaki et al. | 382/30 |
| 5,247,363 | 9/1993 | Sun et al. | 358/167 |
| 5,253,339 | 10/1993 | Wells et al. | 395/126 |
| 5,386,234 | 1/1995 | Veltman et al. | 348/409 |
| 5,440,652 | 8/1995 | Ting | 382/165 |
| 5,461,420 | 10/1995 | Yonemitsu et al. | 348/401 |
| 5,481,553 | 1/1996 | Suzuki et al. | 371/49.1 |
| 5,515,388 | 5/1996 | Yagasaki | 371/49.1 |
| 5,552,831 | 9/1996 | Machida et al. | 348/416 |
| 5,561,532 | 10/1996 | Ohnishi et al. | 386/47 |
| 5,574,800 | 11/1996 | Inoue et al. | 382/149 |
| 5,596,655 | 1/1997 | Lopez | 382/173 |
| 5,604,822 | 2/1997 | Pearson et al. | 382/199 |
| 5,612,978 | 3/1997 | Blanchard et al. | 375/350 |
| 5,617,487 | 4/1997 | Yoneyama et al. | 382/199 |
| 5,627,918 | 5/1997 | Carasso | 382/254 |
| 5,630,037 | 5/1997 | Schindler | 395/131 |
| 5,636,295 | 6/1997 | Kim | 382/265 |
| 5,687,251 | 11/1997 | Erler et al. | 382/133 |
| 5,764,307 | 6/1998 | Ozcelik et al. | 348/607 |
| 5,784,498 | 7/1998 | Venable et al. | 382/280 |

FOREIGN PATENT DOCUMENTS

0727910 A2  8/1996  European Pat. Off. ......... H04N 7/68

OTHER PUBLICATIONS

U.S. application No. 08/733,953, filed Oct. 21, 1996, Hirani et al.
K. Popat et al., "Novel Cluster–Based Probability Model for Texture Synthesis, Classification, and Compression", Massachusettes Institute of Technology, Media Laboratory, SPIE vol. 2094, pp. 756–768, Nov. 1993.
IEEE Transactions on Medical Imaging, vol. MI–1, No. 2, pp. 95–101, Oct. 1982, M.I. Sezan et al., "Image Restoration by the Method of Convex Projections: Part 2—Applications and Numerical Results."

(List continued on next page.)

Primary Examiner—Andrew I. Faile
Assistant Examiner—Reubeu M. Brown
Attorney, Agent, or Firm—Limbach & Limbach L.L.P.

[57]                 ABSTRACT

Methods and apparatus for removing scratch and wire noise from digitized images handle the difficult case of non-uniformly shaded images which is the common situation in real applications. The methods and apparatus also utilize a soft edge noise mask to allow a smoother blending of the reconstructed noise and the image around the noise. wire noise removal from digitized images wherein a scratched portion of a digitized image which requires repair or noise removal is identified and a binary mask is generated which distinguishes the defined scratched portion from the other portions of the digitized image. The methods and apparatus utilize both the spatial and frequency domains to effectively reconstruct many contiguous noisy pixels, reconstruct textures even when they are large featured, maintain sharpness and maintain continuity of features across a noisy region. A set of instructions for executing the methods is contained in a program storage device. Also, a recording media contains digital data generated using the methods.

100 Claims, 10 Drawing Sheets

OTHER PUBLICATIONS

Optical Society of America, vol. 6, No. 6, pp. 844–851, Jun. 1989, H. Peng et al., "Signal Recovery with Similarity Constraints."

P. Ferreira et al., "Errorless Restoration Algorithms for Band–Limited Images," IEEE Conference Nov. 13–16, 1994, pp. 157–161.

Applied Optics, vol. 21, No. 15, pp. 2758–2769, Aug. 1, 1982, J.R. Fienup, "Phase Retrieval Algorithms: A Comparison."

IEEE Transactions on Circuits and Systems, vol. CAS–22, No. 9, pp. 735–742, Sep. 1975, A. Papoulis, "A New Algorithm in Spectral Analysis and Band–Limited Extrapolation."

IEEE Transactions on Acoustics, Speech, and Signal Processing, vol. ASSP–29, No. 4, pp. 830–845, Aug. 1981, A. Jain, "Extrapolation Algorithms for Discrete Signals with Application in Spectral Estimation."

Optical Society of America, vol. 9, No. 7, pp. 1041–1051, Jul. 1992, J. Pang et al., "Signal Recovery from Subband Energy Constraints."

IEEE Transactions on Medical Imaging, vol. MI–1, No. 2, pp. 81–94, Oct. 1982, D.C. Youla et al., "Image Restoration by the Method of Convex Projections: Part 1—Theory."

Proceedings of the IEEE, vol. 69, No. 4, pp. 432–450, Apr. 1981, R. Schafer, "Constrained Iterative Restoration Algorithms."

U.S. application No. 08/733,953, Oct. 21, 1996, Hirani et al.

U.S. application No. 08/561,377, Nov. 21, 1995, Mitsunaga et al.

U.S. application No. 08/816,867, Mar. 13, 1997, Ozcelik et al.

B. Benson, "Television Engineering Handbook," McGraw Hill, New York, Publication Date Dec. 1985, pp. 2.7 & 2.8.

S. Inoue, "An Object Extraction Method for Image Synthesis," Proceedings of SPIE, The International Society for Optical Engineering, Conference Date Nov. 1991, vol. J74–D–11, No. 10, pp. 1411–1418.

H. Sun et al., "Adaptive Error Concealment Algorithm for MPEG Compressed Video," SPIE vol. 1818, Visual Communications and Image Processing, Nov. 1992, pp. 814, –821.

S. Lee et al., "Transmission Error Detection, Resynchronization and Error Concealment for MPEG Video Decoder," SPIE vol. 2094, Nov. 1993, pp. 195–204.

IEEE Transactions on Signal Processing, vol. 39, No. 10, pp. 2275–2285, Oct. 1991, M. Sezan, et al., "Prototype Image Constraints for Set–Theoretic Image Restoration."

Optica Acta, 1974, vol. 21, No. 9, 709–720, R.W. Gerchberg, "Super–Resolution Through Error Energy Reduction." (Received Sep. 13, 1973, Revision Received Jan. 15, 1974).

TM Technisches Messen No. 10, Oct. 1992, Munchen, "Suppression of Stochastically Placed, Straight Toolmarks to Enhance Objects and Defects," by J. Beyerer, pp. 389–397.

IMAGE WITH SCRATCH OR WIRE NOISE

IMAGE WITH NOISE MASK PAINTED OVER NOISE

IMAGE WITH NON UNIFORM SHADING

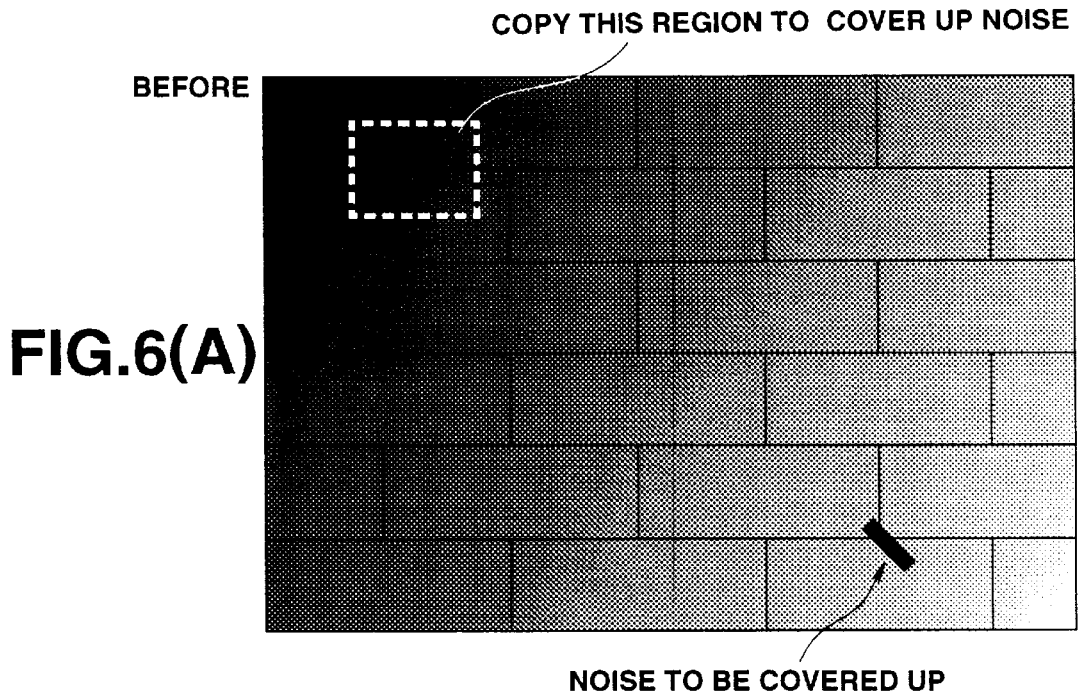

FIG.6(A) BEFORE — COPY THIS REGION TO COVER UP NOISE / NOISE TO BE COVERED UP

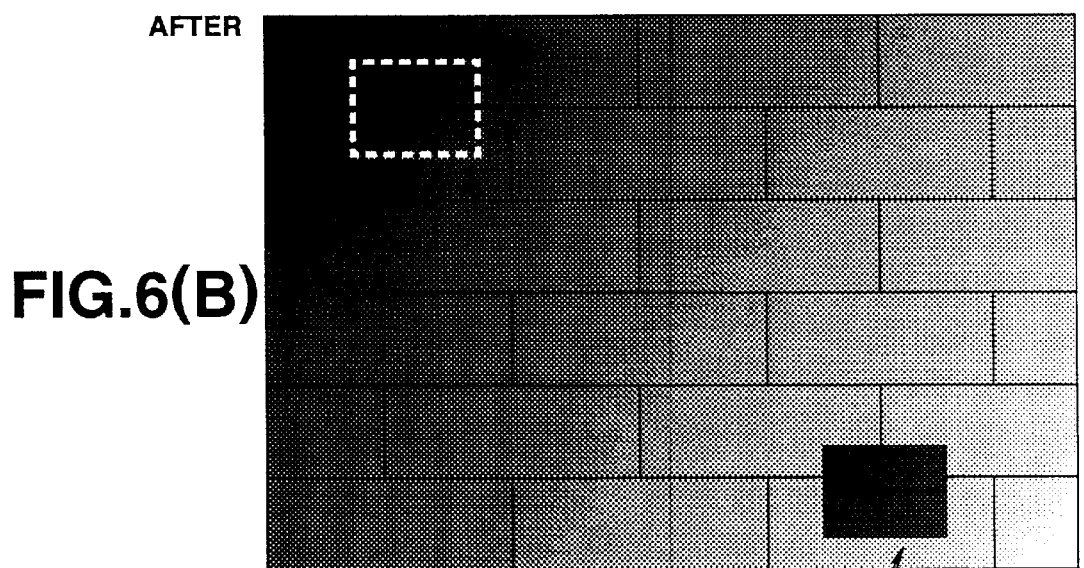

FIG.6(B) AFTER — DOTTED AREA COPIED HERE. THE NOISE HAS BEEN COVERED UP BUT THE LINES ARE MISALIGNED AND THE COLOR OF THE COVER UP AREA IS DIFFERENT FROM SURROUNDING.

PROBLEMS WITH SIMPLE COPYING IN IMAGE WITH NON UNIFORM SHADING. COPYING FORM ANOTHER AREA TO COVER UP NOISE CAN CREATE MISALIGNMENT AND SHADING MISMATCH.

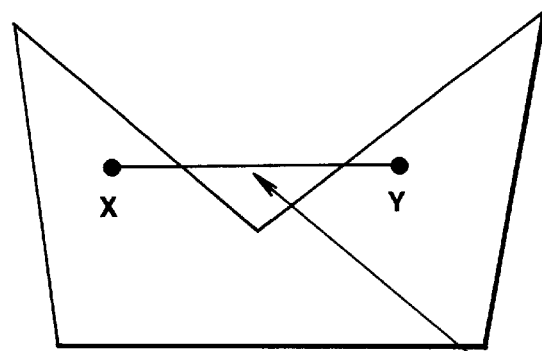
FIG.7(A) CONCAVE
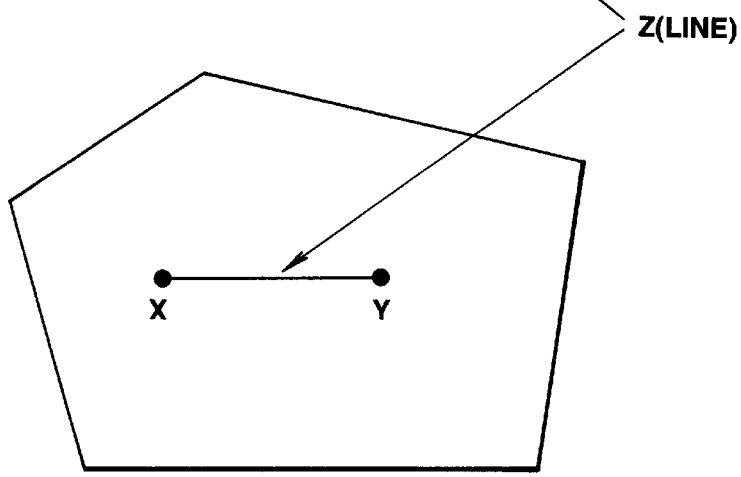
FIG.7(B) CONVEX
Z = UX+(1−U)X
0 <= U <= 1
X AND Y ARE IMAGES

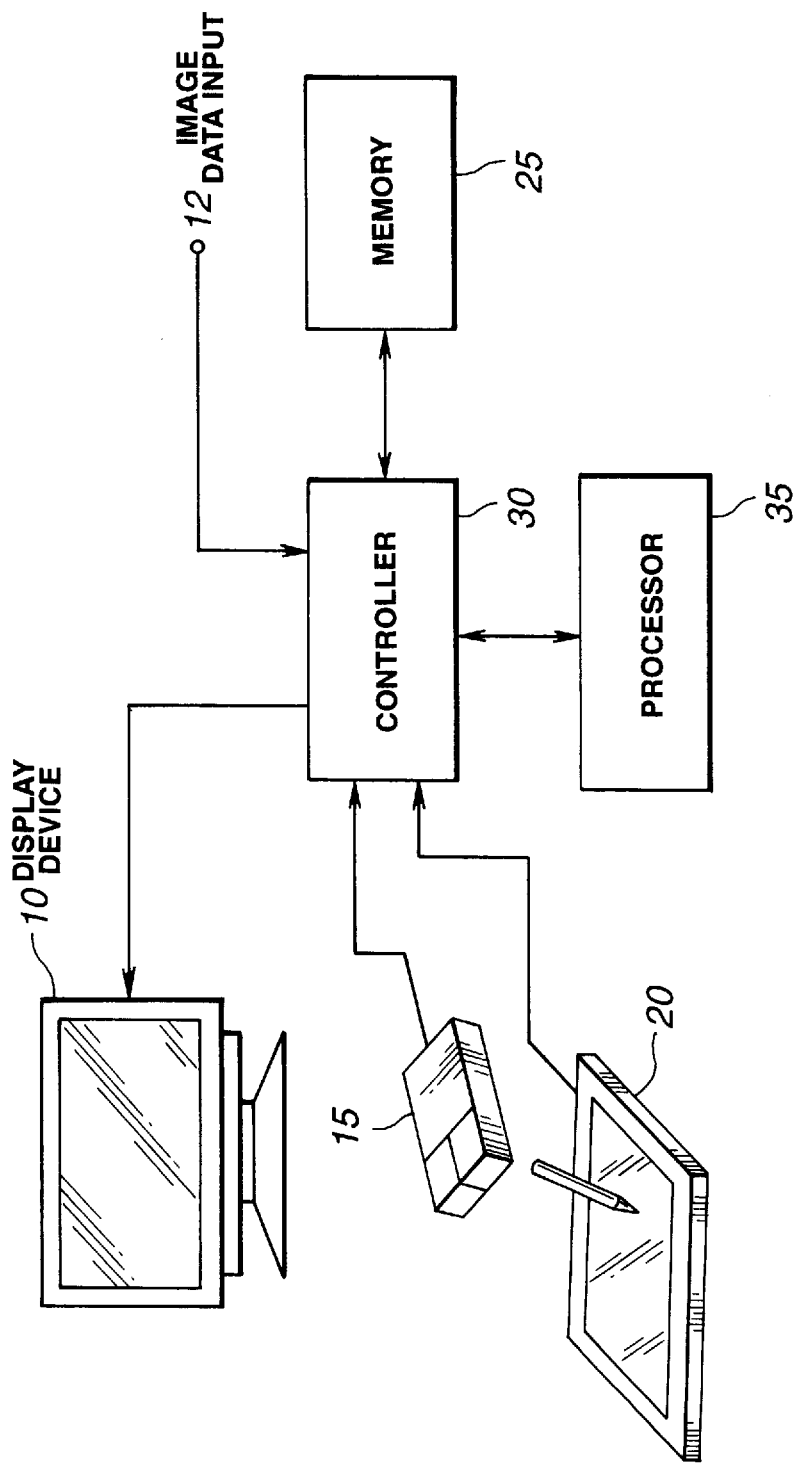

STEP1

USER PAINTS A BINARY MASK OVER THE NOISE AREA. THIS MASK IS WIDE ENOUGH TO COVER THE NOISE BUT DOES NOT HAVE TO BE OF EXACTLY THE SAME SHAPE. THE USER THEN SELECTS A RECTANGULAR AREA OF IMAGE AROUND THE NOISE AREA AND DESIGNATES IT THE REPAIR SUBIMAGE. THEN THE USER SELECTS A RECTANGULAR AREA TO THE IMAGE WHICH DOES NOT CONTAIN NOISE AND IS SIMILAR TO THE REPAIR SUBIMAGE AND OF THE EXACT SAME SIZE AS IT. THIS AREA IS DESIGNATED THE SAMPLE SUBIMAGE. THE MEANING OF "SIMILAR" IS EXPLAINED IN THE TEXT. THE RELATIVE LOCATIONS OF PROMINENT LINES IN THE SAMPLE CAN BE DIFFERENT FROM THE REPAIR SUBIMAGE. THE USER ALSO SELECTS THE NUMBER OF TIMES THE LOOP SHOWN IN STEPS 5 TO 10 SHOULD BE PERFORMED.

STEP2

CALCULATE THE FAST FOURIER TRANSFORM (FFT) OF THE SAMPLE SUBIMAGE S. THE OUTPUT OF THE FFT IS PHASE AND MAGNITUDE OF THE FOURIER TRANSFORM OF S. IGNORE THE PHASE. THE MAGNITUDE (M1) WILL BE USED LATER.

STEP3

CREATE A SOFT EDGED MASK FROM THE USER PAINTED BINARY MASK. TO CREATE THE SOFT MASK, INSIDE THE BINARY MASK REGION THE VALUE OF SOFT MASK IS 0. OUTSIDE THE BINARY MASK THE VALUE OF THE SOFT MASK INCREASES FROM 0 TO 1 IN A GAUSSIAN FASHION. i.e. FOR THE PIXELS OUTSIDE THE BINARY MASK, IF d IS THE DISTANCE FROM THE BINARY MASK THEN THE VALUE OF SOFT MASK IS $1-\exp(-k*d*d)$ WHERE k IS A CONSTANT THE USER CAN SET TO MAKE THE SOFT EDGE OF THE MASK RISE VERY RAPIDLY OR MORE SLOWLY. GENERALLY A CONSTANT VALUE OF 0.15 HAS BEEN FOUND TO BE SATISFACTORY. AFTER A FIXED DISTANCE AWAY FROM THE BINARY MASK. THE SOFT MASK IS MADE 1. WE HAVE FOUND THE DISTANCE OF ABOUT 5 PIXELS TO BE SATISFACTORY FOR THIS PURPOSE.

STEP4

MULTIPLY THE REPAIR SUBIMAGE WITH THE NOISE MASK. AS A RESULT THE ORIGINAL NOISE WILL BE COVERED BY BLACK REGION OF THE MASK. THE SOFT REGION OF THE MASK WILL REDUCE THE VALUE OF THE ORIGINAL PIXELS UNDERNEATH BY A MULTIPLICATIVE FACTOR WHICH GOES FROM NEAR 0 NEAR THE NOISE EDGE TO NEAR 1 A FEW PIXELS AWAY FROM THE EDGE OF THE NOISE MASK AND HAS VALUES BETWEEN 0 AND 1 IN BETWEEN. THE MULTIPLIED RESULT IS KNOWN AS MASKED REPAIR SUBIMAGE. THIS MASKED REPAIR SUBIMAGE IS REFERRED TO AS "R".

STEP5-10

GO TO STEPS 5 TO 10 SHOWN IN FIGURE 10

STEP11

SATISFIED WITH RESULTS ?

YES → DONE

NO : USER WILL REPAINT NOISE MASK OVER AREAS THAT DON'T LOOK GOOD. NEW REPAIR AND SAMPLE IMAGES MAY HAVE TO BE SELECTED.

DETAILS OF THE STEPS FOR A METHOD THAT USES A SOFT NOISE MASK TO REMOVE IMAGE NOISE. THE INTERMEDIATE STEPS SHOWN AS STEPS 5-10 HERE ARE IN FIGURE 10.

FIG.9

OUTPUT OF PREVIOUS ITERATION BECOMES THE MASKED REPAIR SUBIMAGE FOR THIS ITERATION.

( FROM STEP 4 OF FIGURE 9 )

STEP5

CALCULATE THE FAST FOURIER TRANSFORM (FFT) OF MASKED REPAIR SUBIMAGE R AND PASS THE MAGNITUDE (M2) AND PHASE (P2) CALCULATED BY FFT TO THE NEXT STEP.

STEP6

CALCULATE THE MINIMUM OF MAGNITUDES M1 AND M2. M1 IS THE MAGNITUDE OF FFT OF SAMPLE SUBIMAGE AND M2 IS THE MAGNITUDE OF THE FFT OF MASKED REPAIR SUBIMAGE. THIS IS DONE FOR ALL FREQUENCIES EXCEPT AT DC. AT DC THE VALUE FROM M2 IS CHOSEN. PASS THIS NEW MAGNITUDE CALCULATED BY TAKING MINIMUM AS A NEW VALUE OF THE FOURIER TRANSFORM MAGNITUDE TO BE USED BY THE NEXT STEP. PASS THE PHASE INFORMATION P2 PRODUCED BY TAKING THE FFT OF THE MASKED REPAIR SUBIMAGE AS IS WITHOUT MODIFICATION TO THE NEXT STEP.

STEP7

CALCULATE THE INVERSE FAST FOURIER TRANSFORM (IFFT) USING MAGNITUDE AND PHASE OUTPUT BY THE PREVIOUS STEP.

STEP8

MAKE THE INPUT VALUES REAL. THE INPUT IS A MATRIX OF NUMBERS SOME OF WHICH MAY BE COMPLEX NUMBERS. FOR SUCH ENTRIES IN THE MATRIX SET THE COMPLEX VALUE TO 0. ALSO THE REAL VALUES MAY BE OUTSIDE THE RANGE OF 0 TO 255. IF THE ENTRY IS LESS THAN 0 MAKE IT 0. IF IT IS MORE THAN 255 THEN MAKE IT 255. OTHERWISE LEAVE IT UNTOUCHED.

STEP9

MIX THE PIXELS IN THE OUTPUT OF PREVIOUS STEP WITH THE PIXELS OF THE ORIGINAL REPAIR SUBIMAGE. THE VALUES THAT ARE FAR AWAY FROM THE MASK SHOULD BE RESET TO THE VALUES FROM THE ORIGINAL REPAIR SUBIMAGE BECAUSE THEY ARE KNOWN TO BE NOISE FREE. THE VALUES THAT ARE IN THE REGION OF THE MASK THAT IS 0 SHOULD BE LEFT AS IS BECAUSE THE ORIGINAL REPAIR SUBIMAGE IS KNOWN TO BE NOISY THERE AND WE HAVE JUST CALCULATED BETTER VALUES FOR THIS REGION. FOR VALUES OF THE SOFT MASK THAT ARE BETWEEN 0 AND 1 THERE WILL BE A MIXING OF VALUES JUST CALCULATED IN PREVIOUS STEP AND THOSE IN THE ORIGINAL REPAIR SUBIMAGE. ALL THESE THREE TYPES OF OPERATIONS (FOR SOFT MASK VALUE 0, 1 AND BETWEEN 0 AND 1) CAN BE DEFINED IN THE FOLLOWING WAY. IF MASK VALUE IS m AT A POINT THEN THE NEW PIXEL AT THAT POINT WILL BE : m * r0 + (1-m) * r  WHERE r0 IS THE VALUE AT THAT POINT IN THE R AND r IS THE VALUE AT THAT POINT IN THE OUTPUT OF PREVIOUS STEP.

STEP10 REQUIRED NUMBER OF ITERATIONS DONE ? — NO

YES ( GO TO STEP 11 OF FIGURE 9 )

DETAILS OF THE STEPS 5-10 FOR A METHOD THAT USES A SOFT NOISE MASK TO REMOVE IMAGE NOISE. THE STEPS BEFORE AND AFTER ARE SHOWN IN FIGURE 9

FIG.10

STEP1
USER PAINTS A BINARY MASK OVER THE NOISE AREA. THIS MASK IS WIDE ENOUGH TO COVER THE NOISE BUT DOES NOT HAVE TO BE OF EXACTLY THE SAME SHAPE. THE USER THEN SELECTS A RECTANGULAR AREA OF IMAGE AROUND THE NOISE AREA AND DESIGNATES IT THE REPAIR SUBIMAGE. THEN THE USER SELECTS A RECTANGULAR AREA OF THE IMAGE WHICH DOES NOT CONTAIN NOISE AND IS SIMILAR TO THE REPAIR SUBIMAGE AND OF THE EXACT SAME SIZE AS IT. THIS AREA IS DESIGNATED THE SAMPLE SUBIMAGE. THE MEANING OF "SIMILAR" IS EXPLAINED IN THE TEXT. THE SAMPLE CAN BE CONSIDERABLY DARKER OR BRIGHTER THAN THE REPAIR SUBIMAGE. THE RELATIVE LOCATIONS OF PROMINENT LINES IN THE SAMPLE CAN ALSO BE DIFFERENT FROM THE REPAIR SUBIMAGE. THE USER ALSO SELECTS THE NUMBER OF TIMES THE LOOP SHOWN IN STEP 6 TO 14 SHOULD BE PERFORMED.

STEP2
CREATE A SOFT EDGED MASK FROM THE USER PAINTED BINARY MASK IF THE USER SO DESIRES. TO CREATE THE SOFT MASK, INSIDE THE BINARY MASK REGION THE VALUE OF SOFT MASK IS 0. OUTSIDE THE BINARY MASK THE VALUE OF THE SOFT MASK INCREASES FROM 0 TO 1 IN A CAUSSIAN FASHION. i.e. FOR THE PIXELS OUTSIDE THE BINARY MASK, IF d IS THE DISTANCE FROM THE BINARY MASK THEN THE VALUE OF SOFT MASK IS $1-\exp(-k*d*d)$ WHERE k IS A CONSTANT THE USER CAN SET TO MAKE THE SOFT EDGE OF THE MASK RISE VERY RAPIDLY OR MORE SLOWLY. GENERALLY A CONSTANT VALUE OF 0.15 HAS BEEN FOUND TO BE SATISFACTORY. AFTER A FIXED DISTANCE AWAY FROM THE BINARY MASK. THE SOFT MASK IS MADE 1. WE HAVE FOUND THE DISTANCE OF ABOUT 5 PIXELS TO BE SATISFACTORY FOR THIS PURPOSE.

STEP3
FILTER THE SAMPLE SUBIMAGE USING A LOW PASS FILTER TO CREATE A LOW PASS FILTERED SAMPLE SUBIMAGE (LS) AND A HIGH PASS FILTERED SUBIMAGE (HS). THE LOW PASS VERSION WILL BE IGNORED AND THE HIGH PASS FILTERED SAMPLE SUBIMAGE BECOMES THE INPUT OF THE NEXT STEP.

STEP4
CALCULATE THE FAST FOURIER TRANSFORM (FFT) OF THE HIGH PASS FILTERED SAMPLE SUBIMAGE HS. THE OUTPUT OF THE FFT IS PHASE AND MAGNITUDE OF THE FOURIER TRANSFORM OF HS. IGNORE THE PHASE. THE MAGNITUDE (M1) WILL BE USED LATER.

STEP5
MULTIPLY THE REPAIR SUBIMAGE WITH THE NOISE MASK. THIS NOISE MASK CAN BE BINARY OR IT CAN BE A SOFT EDGED MASK. IF IT IS BINARY THEN THE ACTUAL NOISE IN THE REPAIR SUBIMAGE WILL BECOME COVERED BY A BLACK REGION. OUTSIDE THIS REGION IS THE PART OF IMAGE WHICH IS NOISE FREE. THE MULTIPLIED RESULT IS KNOWN AS MASKED REPAIR SUBIMAGE. IF A SOFT NOISE MASK WAS REQUESTED THEN THE SOFT REGION OF THE MASK WILL REDUCE THE VALUE OF THE ORIGINAL PIXELS UNDERNEATH BY A MULTIPLICATIVE FACTOR WHICH GOES FROM NEAR 0 NEAR THE NOISE EDGE TO NEAR 1 A FEW PIXELS AWAY FROM THE EDGE OF THE NOISE MASK AND HAS VALUES BETWEEN 0 AND 1 IN BETWEEN. THE MULTIPLIED RESULT IS KNOWN AS MASKED REPAIR SUBIMAGE.

STEP6-14 GO TO STEPS 6 TO 14 SHOWN IN FIGURE 12

STEP15 SATISFIED WITH RESULTS?

YES → DONE

NO: USER WILL REPAINT NOISE MASK OVER AREAS THAT DON'T LOOK GOOD. NEW REPAIR AND SAMPLE IMAGES MAY HAVE TO BE SELECTED.

FLOWCHART FOR METHOD FOR REMOVING NOISE FROM IMAGES WISH NON UNIFORM SHADING. THE DETAILS OF STEPS 6-14 ARE SHOWN IN FIGURE 12.

FIG.11

OUTPUT OF PREVIOUS ITERATION BECOMES THE MASKED REPAIR SUBIMAGE FOR THIS ITERATION.

( FROM STEP 5 OF FIGURE 11 )

STEP6
SPLIT THE MASKED REPAIR SUBIMAGE INTO TWO IMAGES, ONE WHICH IS HIGH PASS FILTERED (HR) AND ONE WHICH IS LOW PASS FILTERED (LR). LR WILL NOT BE SENT TO THE NEXT STEP BUT WILL GO INSTEAD TO STEP 12. ONLY HR IS PASSED TO NEXT STEP DIRECTLY.

STEP7
CALCULATE THE FAST FOURIER TRANSFORM (FFT) OF HR AND PASS THE MAGNITUDE (M2) AND PHASE (P2) CALCULATED BY FFT TO THE NEXT STEP.

STEP8
CALCULATED THE MINIMUM OF MAGNITUDE M1 AND M2. M1 IS THE MAGNITUDE OF FFT OF SAMPLE SUBIMAGE AND M2 IS THE MAGNITUDE OF THE FFT OF MASKED REPAIR SUBIMAGE. PASS THIS NEW MAGNITUDE CALCULATED BY TAKING MINIMUM AS A NEW VALUE OF THE FOURIER TRANSFORM MAGNITUDE TO BE USED BY THE NEXT STEP. PASS THE PHASE INFORMATION P2 PRODUCED BY TAKING THE FFT OF THE MASKED REPAIR SUBIMAGE AS IS WITHOUT MODIFICATION TO THE NEXT STEP.

STEP9
CALCULATE THE INVERSE FAST FOURIER TRANSFORM (IFFT) USING MAGNITUDE AND PHASE OUTPUT BY THE PREVIOUS STEP.

STEP10
MAKE THE INPUT VALUES REAL. THE INPUT IS A MATRIX OF NUMBERS SOME OF WHICH MAY BE COMPLEX NUMBERS. FOR SUCH ENTRIES IN THE MATRIX SET THE COMPLEX VALUE TO 0. ALSO THE REAL VALUES MAY BE OUTSIDE THE RANGE OF 0 TO 255. IF THE ENTRY IS LESS THAN 0 MAKE IT 0. IF IT IS MORE THAN 255 THEN MAKE IT 255. OTHERWISE LEAVE IT UNTOUCHED.

STEP11
MIX THE PIXELS IN THE OUTPUT OF PREVIOUS STEP WITH THE PIXELS OF THE HIGH PASS FILTERED MASKED REPAIR SUBIMAGE CREATED IN STEP 6. THE VALUES THAT ARE FAR AWAY FROM THE MASK AND SHOULD BE RESET TO THE VALUES FROM THE MASKED REPAIR SUBIMAGE BECAUSE THEY ARE KNOWN TO BE NOISE FREE. THE VALUES THAT ARE IN THE REGION OF THE MASK THAT IS 0 SHOULD BE LEFT AS IS BECAUSE THE ORIGINAL MASKED REPAIR SUBIMAGE IS KNOWN TO BE NOISY THERE AND WE HAVE JUST CALCULATED BETTER VALUES FOR THIS REGION. FOR VALUES OF THE SOFT MASK THAT ARE BETWEEN 0 AND 1 THERE WILL BE A MIXING OF VALUES JUST CALCULATED IN PREVIOUS STEP AND THOSE IN THE MASKED REPAIR SUBIMAGE. ALL THESE THREE TYPES OF OPERATIONS (FOR SOFT MASK VALUE 0, 1 AND BETWEEN 0 AND 1) CAN BE DEFINED IN THE FOLLOWING WAY. IF MASK VALUE IS m AT A POINT THEN THE NEW PIXEL AT THAT POINT WILL BE : m * rp+(1-m) * r WHERE rp IS THE VALUE AT THAT POINT IN THE HIGH PASS FILTERED MASKED REPAIR SUBIMAGE R AND r IS THE VALUE AT THAT POINT IN THE OUTPUT OF PREVIOUS STEP.

STEP12
MERGE THE OUTPUT OF THE PREVIOUS STEP AND THE LOW PASS FILTERED MASKED REPAIR SUBIMAGE LR FROM STEP 6. MERGING CONSISTS OF SIMPLY ADDING THESE TWO IMAGES.

STEP13
IF ANY PIXEL OF THE INPUT OF THIS STEP IS GREATER THAN 255 THEN MAKE IT 255. OTHERWISE LEAVE IT UNTOUCHED.

STEP14 REQUIRED NUMBER OF ITERATIONS DONE ? — NO

YES ( GO TO STEP 15 OF FIGURE 11 )

FLOWCHART FOR STEPS 6-14 FOR REMOVING NOISE FROM IMAGE WITH NON UNIFORM SHADING. THE OTHER STEPS ARE SHOWN IN FIGURE 11.

FIG.12

METHODS, APPARATUS AND PROGRAM STORAGE DEVICE FOR REMOVING SCRATCH OR WIRE NOISE, AND RECORDING MEDIA THEREFOR

BACKGROUND OF THE INVENTION

1. Field of the Invention

The present invention relates to methods and apparatus for removing noise from digital images, such as for example, digitized photographic images or computer generated images ("CGI") and more particularly to scratches in, or debris on, old motion picture and still photographic films, as well as special effects wires, or supports, used for special effects in motion picture scenes. The present invention further relates to noise induced into digital images due to transmission errors, or malfunctions of image recording or scanning equipment. The present invention also relates to program storage devices for the methods of the present invention, and to recording medium having recorded thereon digital data prepared using the methods of the present invention.

2. Description of the Related Art

With the growing proliferation of available channels for television broadcast and the increasing use of multimedia viewing platforms, many older motion picture and still frame films are likely to see increased use through transfers to video and digital formats. Unfortunately, many old motion and still photographic films have, over the years of use and viewing, become scratched or dirtied with dust or other debris. Since high definition and digital television formats, as well as other digital multimedia formats, will allow imperfections, such as scratches or debris on the film stock, to be quite noticeable to viewers, there is an increasing need for a method of removing scratches from digitized images without degrading or otherwise adversely affecting the perceived quality of the image.

In motion pictures, for example, certain special effects require actors, models or objects in a scene to be suspended or supported via a wire, cable, rod or the like or so as to create the effect of, for example the actor, model or object floating aloft. Typically, the appearance of these wires, cables, rods etc. is later removed from visibility in the scene during post production via optical processing or, more typically these days, via digital processing of the digitized film. Similarly in desktop publishing it is often desirable to remove unwanted portions of an image or erase scratches or blemishes from photographs. It should be noted that the usage of the term "scratch" or "scratch noise" as used herein, is intended to include all of the above noted types of noise which may occur in a digitized image.

A scratch in a digitized image presents itself as unwanted pixels in the digitized image. Scratch noise typically consists of a plurality of contiguous pixels rather than small isolated groups, or clusters, of pixels. In a digitized image, scratch noise may consist of an area of pixels of, for example, 10 pixels×100 pixels, and may fall in an area of the digitized image wherein details such as textures or edges are crossed by the scratch. In order to remove the scratch from the digitized image, the pixels which make up the scratch area must be replaced with pixel data which represents, or emulates the original data. In order to effectively repair scratched areas, this pixel data should allow the resulting image to be as sharp in the scratch area as in the surrounding area. Further, continuity of prominent edges should be maintained, and textures created to replace the wire or scratch pixels should match the surrounding texture.

The effectiveness of currently known techniques of digital processing varies according to the features of the image and their relative size within the image at issue and whether they are regularly or randomly occurring. Examples of regularly occurring features include a brick wall or fabric weave texture. Examples of randomly occurring features may include an asphalt roadway or concrete walk or sandy beach. The effectiveness of known techniques also depends upon the size and type of the scratch area. Scratches which show up as small, isolated clusters of noise pixels in smooth or blurred areas of an image are typically relatively easy to remove through known techniques such as filtering or simple cloning and painting techniques. However, existing noise removal techniques fall short where the scratch consists of a plurality of contiguous pixels or falls in a textured area of an image or in areas having prominent edges, or lines.

Currently known techniques of image noise removal can be generally categorized into two types: 1) intra-frame techniques and 2) inter-frame techniques. The difference between these two general types of techniques centers primarily on where data for replacement of noise pixels is obtained from. Inter-frame techniques typically copy pixel data needed to replace noise pixels from preceding or succeeding frames. Intra-frame techniques, on the other hand, typically utilize data within the image frame to be repaired for replacement of noise pixels.

Inter-frame methods typically fail to provide suitable results where the images/scenes at issue reflect an extreme level of camera movement or scene activity. These methods also tend to fall short where the scratch extends across several image frames, or where the damaged image frame is the only image frame available for providing data for repairing the image. Unfortunately, it is common for scratches to run across several image frames, because of the motion of typical motion picture films through a typical motion picture projector. In these situations, corresponding pixel data from a preceding/succeeding image frame is not readily available for replacement/copying to the scratched area.

Known techniques of scratch noise removal have addressed the problem of scratch noise removal in several ways, including: (a) low-pass and other linear filtering (b) median and other non-linear filtering, (c) statistical texture synthesis (d) cloning, i.e. copying another part of the image (e) painting manually (f) projection based methods and (g) methods based on solving simultaneous equations. However, these techniques have been less than successful in providing scratch removal so as to yield optimum results in a variety of scratch/image situations. Every image can be considered to be made up of many different undulating images, each having specific rate and amount by which they undulate. Such an analysis of an image into its component undulating images can be done by a method known as fast fourier transform ("FFT"). When the image is analyzed in this way and the information produced by FFT is manipulated, this is known as working in the frequency domain. When an operation is done to the image itself it is known as an operation in spatial domain.

The methods (a) to (e) suffer from the shortcoming that they work only in one such domain. Frequency domain algorithms can capture global structure of the image but lose local control (line continuity, sharpness). As a result, lines and other details become blurred. One problem shared by all spatial-only methods is that they have local control and information but do not have any information about the global structure of the image. The limitation to a local neighborhood is due to practical computational constraints in some cases. In addition, some of these methods like median and other non-linear filtering are inherently incapable of meaningfully using the global information.

Typically the presence of scratch noise appears as a sudden variation in the pixel intensities at the scratch locations when compared with the surrounding pixel intensity values. This sudden variation appears as high frequency components in the frequency spectrum of a image. By removing higher frequency components, variation in pixel intensity can be reduced to thereby lessen the visibility of the scratch area within the image frame. This operation is known as low-pass filtering and involves transforming the image from the spatial (or image) domain into the frequency domain, filtering out a predetermined level of high frequency components and transforming the resulting image frequencies back into an image. Similar results can be achieved via an operation known as a convolution, which operates on the image directly without first converting it into the frequency domain. Low pass filtering is effective in reducing scratch noise from certain types of images, typically images having few details or smooth textures. This technique is not, however, effective for removing scratch noise from images having textures or very detailed areas or prominent edges. Smoothing by low-pass and similar linear filtering techniques, whereby variations in pixel intensities within a given area are averaged out, is not effective since it often results in reconstructed, or repaired, scratch noise areas being blurred and loss of detail in the repaired scratch area.

With median filtering techniques, a given pixel of a subject image is replaced with the median value of the surrounding pixels. Which pixels comprise the surrounding pixels of a pixel at issue is typically defined by specifying the limits of a window enclosing that pixel. For example a window of 10 pixels by 10 pixels (10×10) in which the pixel at issue is located could be used to define the "surrounding" pixels. The surrounding pixels can also be referred to as the "neighborhood" of a given pixel. The size of the window or neighborhood can be varied in accordance with the needs at hand. In applying median filtering to scratch removal where the location of the scratch is known, only the scratch pixels will be replaced by the median value of the surrounding pixels.

Median and similar non-linear filtering techniques work relatively well where the scratch area is limited to a relatively small group of isolated pixels. Typically scratches, and particularly wire noise, consist of many contiguous pixels. As a result, the median value of surrounding pixels is typically the value of the scratch area itself. If a small window, or neighborhood, is chosen, scratches are typically not repaired, since the median value is typically the value of the scratch area itself. In other words, the scratch pixels values are replaced with the value of the scratch pixels. Where a larger window is chosen so as to provide a greater number of surrounding pixels, blurring of the image typically results .

In techniques based on statistical texture synthesis, an area of the damaged image at issue is analyzed and a statistical representation of the image area is developed. This statistical representation is then used to generate a synthesized texture that is similar to the analyzed area . Scratch/ wire noise pixels can then be replaced with the synthesized texture. Statistical methods are based on the assumption that the relationship between pixels in a neighborhood has a statistical description which can be discovered by analysis. Thus a given pixel's characteristics are supposed to depend statistically on some or all of its nearby pixels. Where there is a relationship between pixels which are relatively far apart in distance, the neighborhood necessary for analysis of those pixels must be relatively large. An example would be a brick wall with large bricks or a wide wire mesh photographed close-up. Typically in these methods the computational processing required increases as the number of pixels within the neighborhood on which a given pixel depends is increased. As a result these methods are not useful for textures having large features, such as, for example, the texture of an image of a typical brick wall.

Many popular image processing programs, such as for example, Adobe Photoshop™, provide a tool for copying pixels from one area of the image to another area. With these types of tools, the area of the image to be copied is typically selected, or defined, via use of a mouse, or other pointer/ control device, which allows a user to manipulate a cursor or "brush" on the display screen which displays the image at issue. Using the mouse device, a source area from which pixel data is to be read, or transferred, is defined. Then a destination area to which the pixel data from the source area is to be transferred is defined. "Brush strokes", or movement of the cursor across the destination area, can be accomplished using the mouse. With each "brush stroke" pixels from the source area are copied to the destination area. This method works well when the texture, or pattern, depicted in the image at issue is random or regularly occurring in nature and has relatively small features. Small features might include, for example, spots on a piece of fruit, sand, asphalt of a road, or fabric weave. Where there are, for example, random or regularly occurring details, or patterns, depicted in the image in the form of curved or straight lines then alignment of the edges of the repaired region with that of the surrounding region is very time consuming. Repairing scratches or wires using rubber stamp painting is a task requiring lots of time and skill for many images. Since the human visual system is very sensitive to problems with edges, mismatched edges are relatively easy to pick out by the human eye.

Another technique for scratch removal has been to "paint" over the pixels of the scratch by manually matching the scratch pixels with the surrounding area. This method is very time consuming and the quality of the results obtained depends heavily on the skill of the operator. An even bigger problem is when the image has uneven intensity due to lighting conditions or inter reflections. In such cases, finding the same intensity source area can be difficult. With reference to FIGS. 6(A) and 6(B), such figures illustrate the problems resulting of the simple copying of when attempting to cover up noise in an image with non-uniform shading. Such copying can create misalignment and shading mismatch. In further detail, FIG. 6(A) illustrates an example of noise to be removed or covered up and also illustrates the dotted line region to be copied to cover up such noise. FIG. 6(B) illustrates that the dotted line region has been copied onto the noise. However, the resulting lines are misaligned, and as would be expected because of non-uniform shading, the color of the covered up area is different from that of the surrounding area.

Techniques of scratch noise removal based on projection methods in the context of signal restoration have been previously used. These methods have been used to extend the frequency spectrum of band-limited signals by alternating between signal and transform domains and applying constraints of each domain. The constraints are directed to preservation of known signal values and enforcement of bandlimits. This approach has been generalized through a geometric interpretation which is generally referred to as Projection onto Convex Sets, or POCS. POCS allows the use of any information about the image, such as, for example, the range of luminance values, distinction between defined scratch areas and non-scratch areas, as long as the information can be represented as a closed convex set to be used as a constraint.

In projection based methods an image at issue is projected upon predefined constraints to find another image which closely resembles the image at issue and which is within a defined range of images which satisfy certain pre-defined constraints. The process of finding the closest image satisfying certain pre-defined constraints is known as projecting onto that constraint. Once such an image has been found, this new image, or resultant image, is projected onto the next pre-defined constraint, if any. The constraints represent information that is known about the image. In projection based methods, an image at issue may be considered as a single point in a space which has one or more dimensions. Any point on a flat surface can be described in terms of its X and Y coordinates. Further, any point in a 3-dimensional space, for example a room, can be described in terms of X, Y and Z coordinates. Similarly, an image can be described as a single point in high-dimensional space. For example, an image comprised of 200 pixels by 100 pixels may be represented as a single point having 20,000 dimensions (200×100=20,000). Each dimension of the point represents one of the 20,000 pixels which make up the image. The value of each dimension represents the luminance intensity for the given pixel represented by the particular dimension. In typical gray scale imaging, a gray scale of 256 steps is often used for high quality imaging. Thus, the luminance intensity, or value, of a given pixel may range from 0–255, for example.

Through repeated projections onto various constraints, an image can eventually be found that satisfies all of the constraints imposed, simultaneously. The only condition is that the constraints should represent something known as convex sets. The concept of constraints representing convex sets can be explained as follows. When a constraint is placed on, for example, a set of images that are to be considered, the set of images is reduced to a possibly smaller set than the set of all possible images. If this new, smaller set has the property that any linear combination of two images in the set yields an image which is also within the set, then the set is a convex set. This can be expressed as follows:

$$u(x)+(1-u)(y)=z,$$

where $0 \leq u \leq 1$, and x and y are images.

If x and y are two images which are members of a set S, u is a real number between 0 and 1 inclusive, and z is also an image which is a member of the set S, then the set S is a convex set. FIG. 7(A) illustrates a geometrical definition of Equation 1 and how it is satisfied in convex sets but not in concave sets, as shown for example in FIG. 7(B).

In known projection based methods of scratch noise removal, constraints such as bandlimits are imposed. An image is said to be bandlimited if the fourier transform of the image does not have an infinite frequency spectrum. Limiting the frequency band of an image does not provide desirable results in scratch and wire removal from real images.

Other known techniques of scratch removal are based on solving simultaneous equations. These methods typically involve solving numerous simultaneous equations, often as many equations as there are pixels in the image at issue. The computational requirements to carry out this technique can be quite high. Such methods are most useful in removing blur in images. Iterative and non-iterative linear algebra based methods for scratch removal, which require the solution of only a limited number of equations, up to as many equations as there are pixels in the scratch, have been proposed. However, these methods do not work well where the scratch noise at issue consists of a plurality of contiguous pixels as is typically the case with most scratch noise.

A new method described in our recently filed Japanese Patent Application No.P7-303420 (filed on Oct. 30, 1995), which Japanese Patent Application corresponds to U.S. patent application Ser. No. 08/733,753 (filed on Oct. 21, 1996), presents an algorithm for removing such long thin unwanted noise from images. In U.S. patent application Ser. No. 08/733,753, which U.S. patent application is hereby incorporated by reference, we posed the image noise removal problem as follows:

Given (i) the locations of noisy pixels and (ii) a prototype (sample) image, it is possible to restore those noisy pixels in a natural way.

In our method described in U.S. patent application Ser. No. 08/733,753 the user specifies (a) the location of the noisy pixels by painting a mask (called noise mask) over the noise area using a digital paint brush like tool, (b) an area around the noise (called repair subimage), and (c) an area from a non noisy region to be used as a prototype (called sample subimage). FIG. 1 illustrates an example image with noise. FIG. 2 illustrates a noise mask painted on the noise. FIG. 3 illustrates an example of sample and repair subimage selection.

The embodiments of our U.S. patent application Ser. No. 08/733,953 use spatial and frequency domain information from the sample and repair subimages to remove the noise. In contrast, previous popular approaches like copy-pasting, painting, median filtering and low pass filtering, etc. work only in one domain. Although the results from the method in U.S. patent application Ser. No. 08/733,953 are better than previously known methods, our method in U.S. patent application Ser. No. 08/733,953 was not designed for images which have tremendous intensity variation across their the area of such images.

The present invention seeks to overcome the shortcomings set forth above and to provide methods and apparatus of removing scratch noise from digitized photographic images which yield high quality results without the need for undue operator manipulation.

SUMMARY OF THE INVENTION

It is an object of the present invention to provide a method for removing scratch or wire noise from non-uniformly shaded images.

It is a feature of the present invention to operate in both the spatial and frequency domains to remove scratch or wire noise from non-uniformly shaded images.

It is a further feature of the present invention to utilize a noise mask with soft edges to allow a smoother blending of reconstructed noise and the image around such noise.

It is an advantage of the present invention to provide visually improved removals of scratch or wire noise from non-uniformly shaded images.

According to an aspect of the present invention, a method of removing noise from image data includes the steps of defining an area of noise on the image data, generating a noise mask to distinguish pixels inside the defined area of noise on the image data from pixels outside the area of noise on the image data, defining repair image data including the defined area of noise, defining sample image data which is similar to the repair image data, creating from the noise mask a soft noise mask having a soft edge, performing a frequency transform to the sample image data and to generate frequency transformed data of the sample image data, performing the frequency transform to the repair image data to generate frequency transformed data of the repair image data, performing an inverse transform of the frequency transformed data of the sample image data and the frequency transformed data of the repair image data to generate new repair image data, and generating new image data using the new repair image data, the repair image data and the soft noise mask.

According to another aspect of the present invention, a method of removing noise from image data includes the steps of defining an area of noise on the image data, generating noise mask data to distinguish pixels inside the defined area of noise on the image data from pixels outside the area of noise on the image data, defining sample image data which is similar to the repair image data, filtering the sample image data to generate low pass filtered sample image data and high pass filtered sample image data, performing a frequency transform to the high pass filtered sample image data to generate frequency transformed data of the high pass filtered sample image data, filtering the repair image data to generate low pass filtered repair image data and high pass filtered repair image data, performing the frequency transform to the high pass filtered repair image data to generate frequency transformed data of the high pass filtered repair image data, performing an inverse transform of the frequency transform using the frequency transformed data of the high pass filtered sample image data and the frequency transformed data of the high pass filtered repair image data to generate new high pass filtered repair image data, combining the low pass filtered repair image data and the low pass filtered sample image data to generate low pass filtered image data, generating new high pass filtered image data using the new high pass filtered repair image data, the repair image data and the noise mask, and generating new image data using the new high pass filtered repair image data and the low pass filtered image data.

According to a further aspect of the present invention, an apparatus for removing noise from image data includes means for defining an area of noise on the image data, means for generating a noise mask to distinguish pixels inside the defined area of noise on the image data from pixels outside the area of noise on the image data, means for defining repair image data including the defined area of noise, means for defining sample image data which is similar to the repair image data, means for creating from the noise mask a soft noise mask having a soft edge, means for performing a frequency transform to the sample image data and to generate frequency transformed data of the sample image data, means for performing the frequency transform to the repair image data to generate frequency transformed data of the repair image data, means for performing an inverse transform of the frequency transformed data of the sample image data and the frequency transformed data of the repair image data to generate new repair image data, and means for generating new image data using the new repair image data, the repair image data and the soft noise mask.

According to yet another aspect of the present invention, an apparatus for removing noise from image data includes means for defining an area of noise on the image data, means for generating noise mask data to distinguish pixels inside the defined area of noise on the image data from pixels outside the area of noise on the image data, means for defining sample image data which is similar to the repair image data, means for filtering the sample image data to generate low pass filtered sample image data and high pass filtered sample image data, means for performing a frequency transform to the high pass filtered sample image data to generate frequency transformed data of the high pass filtered sample image data, means for filtering the repair image data to generate low pass filtered repair image data and high pass filtered repair image data, means for performing the frequency transform to the high pass filtered repair image data to generate frequency transformed data of the high pass filtered repair image data, means for performing an inverse transform of the frequency transform using the frequency transformed data of the high pass filtered sample image data and the frequency transformed data of the high pass filtered repair image data to generate new high pass filtered repair image data, means for combining the low pass filtered repair image data and the low pass filtered sample image data to generate low pass filtered image data, means for generating new high pass filtered image data using the new high pass filtered repair image data, the repair image data and the noise mask, and means for generating new image data using the new high pass filtered repair image data and the low pass filtered image data.

According to a further aspect of the present invention, a program storage device readable by a machine, tangibly embodying a program of instructions executable by the machine to perform method steps for removing noise from image data, the method steps including defining an area of noise on the image data, generating a noise mask to distinguish pixels inside the defined area of noise on the image data from pixels outside the area of noise on the image data, defining repair image data including the defined area of noise, defining sample image data which is similar to the repair image data, creating from the noise mask a soft noise mask having a soft edge, performing a frequency transform to the sample image data and to generate frequency transformed data of the sample image data, performing the frequency transform to the repair image data to generate frequency transformed data of the repair image data, performing an inverse transform of the frequency transformed data of the sample image data and the frequency transformed data of the repair image data to generate new repair image data, and generating new image data using the new repair image data, the repair image data and the soft noise mask.

According to yet another aspect of the present invention, a program storage device readable by a machine, tangibly embodying a program of instructions executable by the machine to perform method steps for removing noise from image data, the method steps including defining an area of noise on the image data, generating noise mask data to distinguish pixels inside the defined area of noise on the image data from pixels outside the area of noise on the image data, defining sample image data which is similar to the repair image data, filtering the sample image data to generate low pass filtered sample image data and high pass filtered sample image data, performing a frequency transform to the high pass filtered sample image data to generate frequency transformed data of the high pass filtered sample image data, filtering the repair image data to generate low pass filtered repair image data and high pass filtered repair image data, performing the frequency transform to the high pass filtered repair image data to generate frequency transformed data of the high pass filtered repair image data, performing an inverse transform of the frequency transform using the frequency transformed data of the high pass filtered sample image data and the frequency transformed data of the high pass filtered repair image data to generate new high pass filtered repair image data, combining the low pass filtered repair image data and the low pass filtered sample image data to generate low pass filtered image data, generating new high pass filtered image data using the new high pass filtered repair image data, the repair image data and the noise mask, and generating new image data using the new high pass filtered repair image data and the low pass filtered image data.

According to an additional aspect of the present invention, a recording medium has digital data recorded thereon, the recording medium being prepared by the steps of defining an area of noise on image data, the image data representative of an image, generating a noise mask to distinguish pixels inside the defined area of noise on the image data from pixels outside the area of noise on the image data, defining repair image data including the defined area of noise, defining sample image data which is similar to the repair image data, creating from the noise mask a soft noise mask having a soft edge, performing a frequency transform to the sample image data and to generate frequency transformed data of the sample image data, performing the frequency transform to the repair image data to generate frequency transformed data of the repair image data, performing an inverse transform of the frequency transformed data of the sample image data and the frequency transformed data of the repair image data to generate new repair image data, generating new image data using the new repair image data, the repair image data and the soft noise mask, and recording the new image data on the recording medium.

According to yet a further aspect of the present invention, a recording medium has digital data recorded thereon, the recording medium being prepared by the steps of defining an area of noise in an image represented by image data, the image data representative of an image, generating noise mask data to distinguish pixels inside the defined area of noise on the image data from pixels outside the area of noise on the image data, defining sample image data which is similar to the repair image data, filtering the sample image data to generate low pass filtered sample image data and high pass filtered sample image data, performing a frequency transform to the high pass filtered sample image data to generate frequency transformed data of the high pass filtered sample image data, filtering the repair image data to generate low pass filtered repair image data and high pass filtered repair image data, performing the frequency transform to the high pass filtered repair image data to generate frequency transformed data of the high pass filtered repair image data, performing an inverse transform of the frequency transform using the frequency transformed data of the high pass filtered sample image data and the frequency transformed data of the high pass filtered repair image data to generate new high pass filtered repair image data, combining the low pass filtered repair image data and the low pass filtered sample image data to generate low pass filtered image data, generating new high pass filtered image data using the new high pass filtered repair image data, the repair image data and the noise mask, generating new image data using the new high pass filtered repair image data and the low pass filtered image data, and recording the new image data on the recording medium.

The present invention improves on our previous invention in the U.S. patent application Ser. No. 08/733,953 in two ways. One is to handle the difficult case of non-uniformly shaded images which is the common situation in real applications. The second is to allow the edges of the noise mask to be soft so as to allow a smoother blending of the reconstructed noise and the image around the noise. FIG. 5 illustrates an example of image with non-uniform shading.

The present invention is directed to a method of scratch and wire noise removal from digitized images wherein a scratched portion of a digitized image which requires repair or noise removal is identified and a binary mask is generated which distinguishes the defined scratched portion from the other portions of the digitized image. A repair subimage is defined which delineates the portion of the digitized image desired to be repaired of scratches or other noise, is then defined. The sample subimage is preferably selected so as to be as close in resemblance to the repair subimage as possible. The overall intensity or slow variations of intensity of the sample and repair subimages can however be different from each other.

The Fourier transform is an integration over the entire signal. The Fourier transform decomposes the input signal into a set of waves of different frequencies and phases. After a transform, many of the essential global features of an image become localized, i.e, come closer in the spectrum. These can include repeating patterns, overall image intensity, slow variation in intensity due to inter reflection between various objects in the image or shading etc.

On the other hand, rapidly varying random like texture like asphalt etc. or sharpness of lines and edges appear scattered in the spectrum. These are features that are localized in the spatial domain.

These and other objects, features, advantages and aspects of the invention will become apparent when considered with reference to the following description and the accompanying drawings.

BRIEF DESCRIPTION OF THE DRAWINGS

FIGS. 6(A) and 6(B) are illustrations of alignment and color matching problems with simple copying.

FIGS. 7(A) and 7(B) illustrate a geometrical definition of Equation 1 and how it is satisfied in convex sets but not in concave sets.

FIG. 8 is a block diagram illustrating one embodiment of the apparatus of the present invention.

FIG. 9 and 10 are flowcharts showing the method for using a soft edged noise mask.

FIG. 11 and 12 are flowcharts showing the method for removing noise from images with non-uniform shading.

DETAILED DESCRIPTION OF THE PREFERRED EMBODIMENTS

Figure 1:
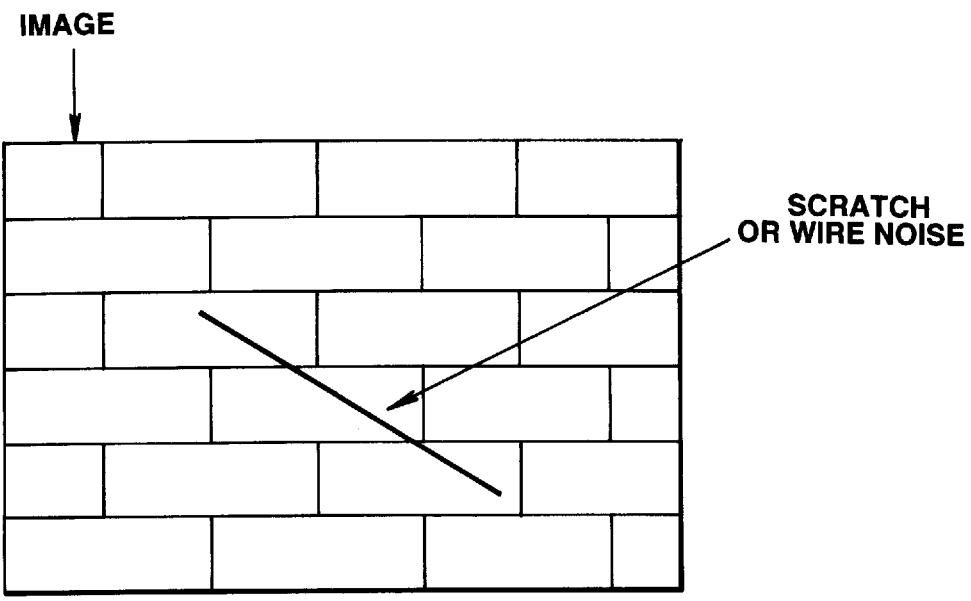
FIG. 1 is an illustration of an example image with noise.

Our previous invention in U.S. patent application Ser. No. 08/733,753 combines the frequency and spatial domains in a POCS framework. The present invention extends this basic concept so that noise can be removed from images that do not have uniform shading. We also extend this basic concept in another way by allowing the noise mask to have soft edges. This allows the pixels created to replace the noisy pixels to merge smoothly with the background pixel in the cases in which the basic method presented in U.S. patent application Ser. No. 08/733,753 has problems. Such images are ones in which there are many closely spaced dark and bright areas in the image.

The efficiency of the present invention is due to the fact that each iteration requires fast operations on small subimages, not on the entire image.

A prototype (sample) based approach for noise removal from images has to satisfy the following criteria.

1) Prominent lines must be made continuous.

2) The texture generated must match the surroundings.

3) A sample of different intensity should be acceptable.

In U.S. patent application Ser. No. 08/733,753 we solved (1) and (2) and our invention showed better results than previous methods for monochrome still images with uniform intensity. Texture of various types and prominent lines were handled correctly. The closest method to our algorithm is the popular method of copy-pasting from another area of image or manual painting to remove noise which is thin and long.

Alignment of prominent lines is difficult in copy pasting and creation of matching texture is difficult in painting. Another problem is finding a prototype area that has the same overall intensity as the area to be repaired. This can be seen in FIG. 6(A) and 6(B).

Although our previous invention in the U.S. patent application Ser. No. 08/733,753 solved the problems (1) and (2) the problem (3) was not solved by that invention. In addition, for images with texture that has many adjacent bright and dark areas, sometimes the transition between reconstructed pixels and background becomes slightly noticeable. To solve this, we created a new algorithm which uses a soft edged noise mask unlike the binary mask used by our previous invention. This solves the problem of abrupt transition. The flow chart detailing this method is shown in FIG. 9.

To solve problem (3), we have invented another algorithm also described in this present invention. Slow varying changes in the image appear as low frequencies while texture appears as high frequencies. By applying a method similar to our algorithm in U.S. patent application Ser. No. 08/733,753 to the high pass filtered image and merging the result with the low pass filtered image in each transition, we are able to handle the case of image with varying intensity or non-uniform shading. Details of this method are set forth in the flow charts of FIGS. 11 and 12.

The present invention recognizes that information describing the structure of an image area to be repaired is often present in another part of the same image. Simply copying this information, pixel by pixel, or generating an average value to replace scratch area pixels yields less than desirable results. The method of the present invention utilizes known, or non-scratched portions of a repair window area, as well as the frequency spectrum of a defined sample window area, to iteratively reconstruct missing pixel information which comprises a defined image scratch area.

Figure 3:
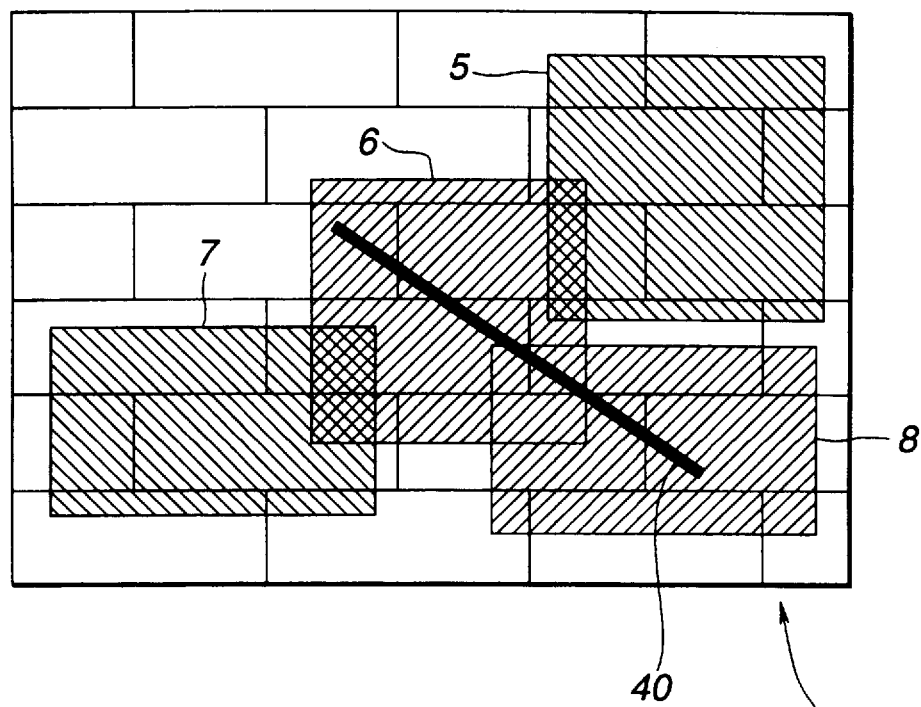
FIG. 3 is an illustration of a repair and sample subimage.
Figure 4:
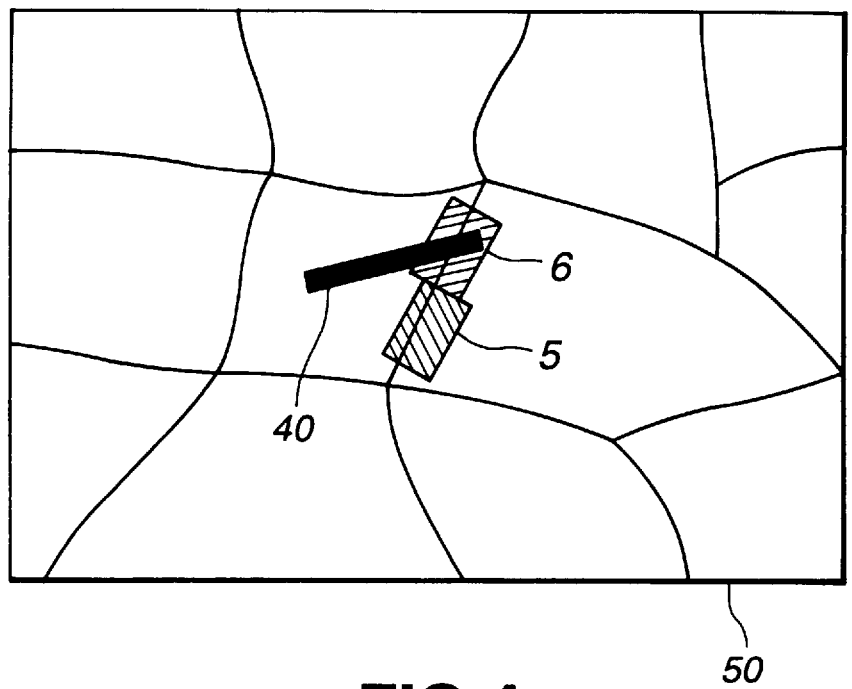
FIG. 4 is an illustration showing a relation between a defined noise area, a repair subimage and a sample subimage.
Figure 5:
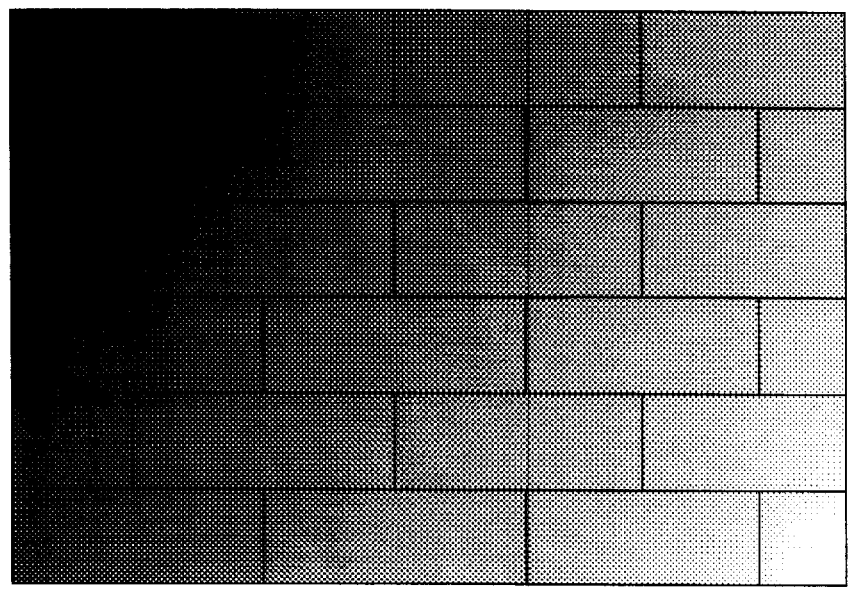
FIG. 5 is an illustration of an image with non-uniform shading.

With reference to FIGS. 3, 4 and 8, an embodiment of the method of the present invention will be described. It should be noted that like reference numerals in the various figures represent like features in each diagram thereof. With reference to FIG. 3 and FIG. 8, data representing an image 50 containing unwanted scratch/wire noise is input via input 12. In FIG. 3 image 50 depicts, for example, a brick wall. It will be noted that the brick wall depicted in image 50 of FIG. 3 has large, regularly occurring features, or prominent edges, which represent the mortar seams found in a typical brick wall. The corresponding image is displayed on display device 10. Using a pointing device, such as, for example, a mouse 15 or pen/tablet 20, the perimeter or area of the scratch 40 is generally highlighted, or defined, by the operator on the display device 10. In defining the scratch area, an operator may use a pointer device to manipulate, or move a cursor/pen/brush across the displayed image and define the scratch area by tracing over the area of the scratch at issue. The width, as well as the shape of the cursor/pen/brush can be varied according to the operator needs or desires. The path traced by the cursor/pen/brush does not have to follow the scratch exactly as long as all pixels of the scratch are covered/highlighted. The memory 25 is configured to store a program of instructions, as further described below, executable by the controller 30 and the processor 35 for removing noise from image data. In operation, controller 30 provides image data from image data input 12 to the processor 35. Processor 35 processes such image data and in turn provides commands to controller 30 in order to store in and retrieve data from memory 25, to accept commands from mouse 15 and/or pen/tablet 20, and to display images on display device 10. It is to be understood that the program of instructions for the methods described below may be stored in memory 25. Alternatively, the program of instructions for the methods described below may be stored in or on a storage device such as a magnetic tape, magnetic disk, optical disk, magneto-optical disc or any other storage device capable of storing such data. In such instances, the program of instructions would be executable by the processor 35 to perform the methods described below.

As illustrated in FIG. 4, binary mask data is generated which distinguishes the defined scratch area from the other areas of the image. This binary mask data could, for example, distinguish the scratch area 40 by assigning a "1" value to each pixel of the defined scratch area and a "0" value to each pixel outside of the defined scratch area, or vice-a versa. This binary mask data is then stored in memory 25.

A repair subimage 6 containing at least a portion of the defined scratch area pixels is defined. Similarly, a sample subimage 5 is defined. The sample subimage 5 is preferably chosen to be an area of the image 50 which most closely resembles the area of the repair subimage 6, in terms of structure, texture lines. The luminance, however can be different. While it is preferable that the sample subimage be chosen to closely resemble the repair subimage area, it is not necessary that features and details depicted in the sample subimage be identically located or oriented within the sample subimage so as to correspond directly to the feature and detail position of the repair subimage. For example, in FIG. 3 it can be seen that the features and details depicted in repair subimage 6 are not positioned within the repair subimage 6 exactly as the features and details of sample subimage 5 are positioned. However, the features and details of sample subimage 6 closely resemble the features and details of repair subimage 5.

The sample subimage 5 preferably has a shape and dimensions which are identical to the repair subimage 6, however, its orientation within the X/Y plane of the image 50 does not have to be identical to that of repair subimage 6. In other words, for example, if the repair subimage 6 has sides which run parallel to the X and Y axes, for example, it is not necessary that the sample subimage 5 also be oriented within the X/Y plane of the image so that the sides thereof run parallel to the X and Y axes thereof. The repair subimage 6 may be defined to be as small or large as the operator finds to be workable. Data representing the respective values of pixels within repair subimage 6 is stored in memory 25, as is data representing the respective values of pixels within sample subimage 5. Memory 25 may be comprised of a number of separate memory units or a single memory unit which is partitioned or otherwise configured so as to separately store the various data.

The present method is based upon the theory of Projection onto Convex Sets, or POCS. In applying POCS, it is important to find the right convex sets and correctly define the projections in order to obtain the desired results.

We first describe the invention that uses a soft noise mask for removing noise from images, and then we describe the invention for removing noise from images with non-uniform shading.

Figure 2:
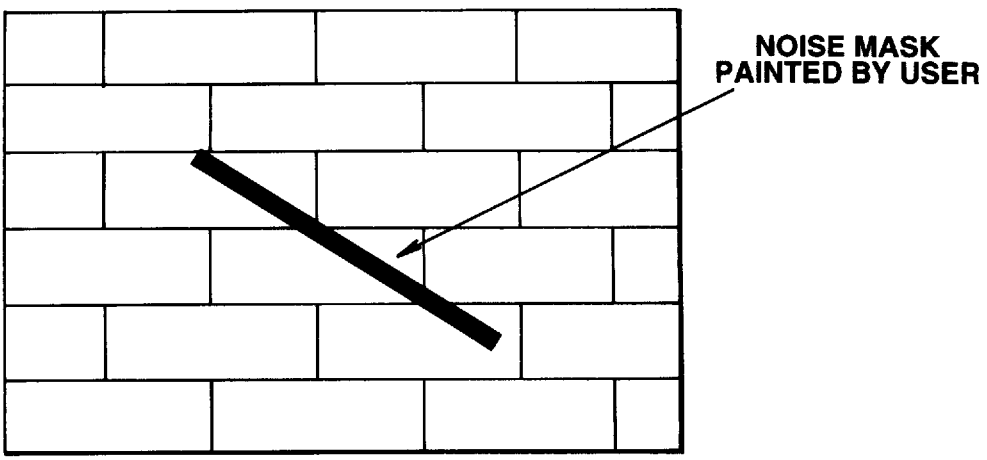
FIG. 2 is an illustration of a noise mask painted over the noise.

Method of and Apparatus for Using a Soft Edged Noise Mask For Image Noise Removal With reference to both FIGS. 9 and 10, and in particular FIG. 9, at step 1 a user paints a binary mask over the noise area. This mask is wide enough to cover the noise but does not have to be of exactly the same shape. The user then selects a rectangular area of image around the noise area and designates it the repair subimage. Then the user selects a rectangular area of the image which does not contain noise and is similar to the repair subimage and of the exact same size as it. This area is designated the sample subimage S. The meaning of "similar" is that the sample and repair subimages should appear to be shifted versions of each other, i.e., the prominent lines inside the sample can be a shifted when compared to the prominent lines in the repair subimage. This can be seen clearly in the schematic shown in FIG. 3 which shows example selections of sample and repair subimages. The noise and noise mask painted over it can be seen in FIGS. 1 and 2. The user also selects the number of times steps 5 to 10 as shown in FIG. will be performed.

At step 2, the fast fourier transform of the sample subimage S is calculated. The output of the fast fourier transform is phase and magnitude of the fourier transform of sample subimage S. In the present method, the phase may be ignored. However, the magnitude M1 will be used later.

At step 3, a soft edged noise mask is created from the user painted binary mask. To create the soft edged noise mask, inside the binary mask region the value of soft mask is 0. Outside the binary mask the value of the soft mask increases from 0 to 1 in a Gaussian fashion, i.e., for the pixels outside the binary mask, if d is the distance from the binary mask then the value of soft mask is $1-\exp(-k \times d \times d)$ where k is a constant the user can set to make the soft edge of the mask rise very rapidly or more slowly. Generally a constant k, having a value of 0.15 has been found to be satisfactory. After a fixed distance away from the binary mask, the soft mask is made 1. We have found the distance of about 5 pixels to be satisfactory for this purpose.

At step 4 the repair subimage is multiplied with the noise mask. As a result, the original noise is covered by a black (hard) region of the mask. The soft region of the mask, however, reduces the value of the original pixels underneath by a multiplicative factor which has a value from near 0 near the noise edge to near 1 a few pixels away from the edge of the noise mask and has values between 0 and 1 in between. The multiplied result is known as masked repair subimage R. In further detail, when multiplying a repair image and a soft edged noise mask, a pixel value of each of the pixels of the repair image is multiplied with a corresponding value of the soft edged noise mask for each pixel according to the following equation:

$$m \times r0,$$

where m is the value of the soft edged noise mask, and r0 is the pixel value of each of the pixels of the repair image.

Referring now to FIG. 10, prior to step 5, as set forth above, the user will already have selected the number of times steps 5 to 10 as shown in FIG. 10 will be performed. At step 5 the fast fourier transform of masked repair subimage R is calculated to generate a magnitude M2 and a phase P2.

At step 6, the minimum of magnitudes M1 and M2 is calculated. M1 is the magnitude of FFT of sample subimage and M2 is the magnitude of the FFT of masked repair subimage. This is done for all frequencies except at DC. At DC the value from M2 is chosen. The calculated minimum magnitude calculated is then used as a new value at step 7, and the phase information P2 generated by the fast fourier transform of the masked repair subimage is utilized as is at step 7.

The reason that the above step 6 is effective, is that noise in general adds magnitude to the spectrum. Taking the minimum of the magnitudes of M1 and M2 effectively reshapes the repair spectrum into the sample spectrum. This step has this nice property, and it is a projection onto a closed convex set (see below). The reason for not modifying the DC value of the repair spectrum is that it contains the value of the overall repair subimage intensity.

Also note that the phase is retained, that is, while reshaping spectrum magnitude we leave the phase of the repair spectrum untouched. It turns out that the phase is reconstructed automatically over several iterations. Phase reconstruction results in the automatic alignment of global features. Doing this in frequency domain is easy. In the spatial domain, an alignment would have required expensive block matching.

At step 7 using the minimum magnitude and phase from step 6, inverse fast fourier transform (IFFT) is calculated. At the end of this step we are back in spatial domain. The result is now closer to the desired answer. But since we modified the spectrum magnitude, e it is possible that after inverse fast fourier transform, we now have imaginary component in the image matrix. Some values may also be outside the feasible range of 0 to 255, which is the allowed range of pixel values for a gray scale image. Therefore at step 8, to bring the values back into the feasible range, the values of the spatial domain matrix are made real (the imaginary component, if any, is dropped) and clipped to the range of 0 to 255. In further detail, once the imaginary component, if any, has been dropped, if the real value is less than 0, the real value is set to the value of 0. If the real value is greater than 255, then the real value is set to be 255. Otherwise, the real value is left as is. In addition, since the previous operation was in frequency domain, it even affects those pixels outside of the noise mask. These pixels must now be corrected in spatial domain. This is done simply by copying the known pixel values around the noise from the original repair subimage. These two rather simple projections are detailed below.

At step 9, pixels output (the new repair image) from step 8 are mixed (combined) with the pixels of the original repair subimage. The values of pixels that are far away from the mask are reset to the values from the original repair subimage because they are known to be noise free. The values of pixels that are in the region of the mask that is 0 are left as is because the original repair subimage is known to be noisy there and we have just calculated better values for this region. For values of the soft edged noise mask that are between 0 and 1, there will be a mixing of values just calculated in previous step with those in the original repair subimage.

When combining the new repair image with the original repair image using a soft edged noise mask, a pixel value of each of the pixels of the new repair image is combined with the pixel value of each of the corresponding pixels of the original repair image, using, for each pixel, the value of the soft edged noise mask in accordance with the following equation:

$$m \times r0 + (1-m) \times r,$$

where m is the value of the soft edged noise mask, r0 is the pixel value of each of the pixels of the repair image, and r is the pixel value of each of the pixels of the new repair image.

At step 10, it is determined whether the requested number of iterations of steps 5 through 9 has been performed. If so, the method proceeds to step 11 (in FIG. 9). If not, the output of the just finished iteration becomes the masked repair subimage R for the next iteration.

At step 11, after the core part of the method (steps 5 through 9) has been repeated the requested number of times as described above, the user examines the results on display device 10. If the results look satisfactory then the method is completed. At this point, the image data may be stored for later transmission or for recording onto a recording medium such as magnetic tape, an optical disc, a magneto-optical disc, or into a random access memory. If not, then the user returns to step 1. Although it is likely that many portions of the noise will have been removed successfully, there sometimes may be some remaining problems spots. The user then points out these problem spots by painting smaller noise masks over these small regions of problem. The user also then selects small repair and sample windows as before, but this time concentrating on the remaining small problem spots, if any. The algorithm is then again repeated from step 1.

Method of and Apparatus for Removing Noise From Images Having Non-Uniform Shading The method described above is useful, like the previous invention in U.S. patent application Ser. No. 08/733,753 for images that have uniform shading. Of course the image can have prominent lines placed systematically or randomly, closely or far away and it can texture, stochastic or repeating. But one thing that the image must have (for the method to be effective) is uniform shading. Non-uniform shading may arise, for example, in the image of a wall that is lighted using a bulb near it. It may also happen because of reflections from other objects that are nearby. All this makes it harder to use the previously described methods described because choosing a sample image with the same overall intensity as the repair subimage can be a problem. Note that to some extent our previously described methods can tolerate differences in overall intensity of sample and repair subimages because they treat DC (which contains information about the overall intensity of an image) differently from the other frequencies.

But when the effect of non-uniform shading is much more pronounced, the above described methods are insufficient. Therefore, we now explain our method and apparatus that treat the low and high frequencies differently. The reason for such treatment is because slow variations in the intensity of the image will appear in the low frequency components, while the texture and sudden changes in intensity will appear in the high frequency component. Our invention as described below takes into account this fact.

Since the overall variation in shading of an image is a global feature and so we choose the frequency domain to attack this problem. The basic idea is very simple—ignore the shading (which is a very large, global feature) by ignoring the low frequency components. Then, to the high frequency image, apply the operations similar to the method of soft noise mask or our previous invention in U.S. patent application Ser. No. 08/733,753 followed by merging the effect of the shading. Now we go through the method step by step.

At the start, as in the previous method, the user paints a binary mask over the noise area. This mask is sufficiently wide to cover the noise, but does not have to be of exactly the same shape. The user then selects a rectangular area of image around the noise area and designates it the repair subimage. Then the user selects a rectangular area of the image which does not contain noise and is similar in appearance to the repair subimage and of the same exact size as the repair subimage. This area is designated the sample subimage. The meaning of "similar," as explained earlier, is that the sample and repair subimages should appear to be shifted versions of each other, i.e., the prominent lines inside the sample can be a shifted when compared to the prominent lines in the repair subimage. This can be seen clearly in the schematic shown in FIG. 3 which shows example selections of sample and repair subimages. The noise and noise mask painted over it can be seen in FIGS. 1 and 2. In addition, because we have designed the method to handle just such a problem, the sample subimage can be considerably darker or brighter than the repair subimage. The user also selects the number of times (iterations) that the core part of the method will be performed. The core part is the method from step 6A through step 13A.

At step 2A, if the user so desires, a soft edged noise mask is created from the user painted binary mask. To create the soft mask, inside the binary mask region the value of soft mask is 0. Outside the binary mask the value of the soft mask increases from 0 to 1 in a Gaussian fashion, i.e., for the pixels outside the binary mask, if d is the distance from the binary mask then the value of soft mask is $1-\exp(-k \times d \times d)$ where k is a constant the user can set to make the soft edge of the mask rise very rapidly or more slowly.

Generally a constant k having a value of 0.15 has been found to be satisfactory. After a fixed distance away from the binary mask, the soft mask is given a value of 1. We have found the distance of about 5 pixels to be satisfactory for this purpose.

At step 3A, using a low pass filter, the sample subimage is filtered to create a low pass filtered sample subimage LS and a high pass filtered subimage HS. The low pass filtered sample subimage is ignored and the high pass filtered sample subimage becomes the input of the next step, step 4A. For the filtering described in the previous two steps any reasonable low pass filter can be used, for example a Gaussian filter that multiplies the frequencies. We have found a Gaussian filter to be adequate. How rapidly the filter falls off can be decided by the user based on the image. Generally, if the non-uniform shading is varying slowly then a narrower filter can be used than if the non-uniform shading is varies in a sudden manner.

At step 4A the fast fourier transform of the high pass filtered sample subimage HS is calculated. The output of the fast fourier transform calculation is phase and magnitude of the fourier transform of sample subimage HS. The phase is ignored, while the magnitude M1 is utilized in the next step, step 5A.

At step 5A the repair subimage is multiplied with the noise mask. This noise mask can be binary or it can be a soft edged noise mask. If it is binary then the actual noise in the repair subimage will become covered by a black region.

Outside this region is the part of image which is noise free. The multiplied result is known as masked repair subimage. If a soft noise mask was requested then the soft region of the mask will reduce the value of the original pixels underneath by a multiplicative factor which has a value from near 0 near the noise edge to near 1 a few pixels away from the edge of the noise mask and has values between 0 and 1 in between. The multiplied result is known as masked repair subimage.

In further detail, when multiplying a repair subimage and a soft edged noise mask, the pixel value of each of the pixels of the repair subimage is multiplied with a corresponding value for each pixel of the soft edged noise mask according to the following equation:

$$m \times r0,$$

where m is the value of a particular pixel of the soft noise mask, and r0 is the pixel value of each of the corresponding pixels of the repair image.

The following steps 6A through 13A represent the core part of the method. These steps will be performed that number of times already selected by the user when the sample and repair subimages were being selected.

At step 6A, the masked repair subimage is split into two images, one which is high pass filtered (HR) and one which is low pass filtered (LR). Any low pass filter can be used for this step. Only HR is passed onto the next step, step 7A. The low pass filtered masked repair subimage is not used in step 7A, but instead is used in step 12A.

At step 7A the fast fourier transform of the high pass filtered masked repair subimage HR is calculated to generate magnitude M2 and phase P2. Magnitude M2 and phase P2 are provided to the next step, step 8A.

At step 8A, the minimum of magnitudes M1 and M2 is calculated. M1 is the magnitude of the fast fourier transform of the sample subimage and M2 is the magnitude of the fast fourier transform of the masked repair subimage. The minimum of magnitudes M1 and M2 is taken as a new value of the fourier transform, and such value together with (unmodified) phase information P2 is provided to the next step of the method, step 9A.

At step 9A, the inverse fast fourier transform is calculated using the magnitude and phase output step 8A.

At step 10A, the calculated inverse fast fourier transform values are made real, that is, any imaginary component in such values are simply dropped. Since the input to step 10A is a matrix of numbers, some of which may be complex numbers, for such entries in the matrix, the imaginary components are set to 0. In addition, since the real values may be outside the range of 0 to 255, if an entry is less than 0, the entry is reset to be 0. If the entry is more than 255, the entry is reset to be 255. Otherwise, the real value is left untouched.

At step 11A, the pixels output by step 10A are mixed with the pixels of the high pass filtered masked repair subimage created in step 6A. The values that are far away from the mask should be reset to the values from the masked repair subimage because they are known to be noise free. The values that are in the region of the mask that is 0 should be left as is because the original masked repair subimage is known to be noisy there and we have just calculated better values for this region. For values of the soft masks that are between 0 and 1 there will be a mixing of values just calculated in previous step and those in the masked repair subimage. All these three types of operations (for soft mask value 0, 1 and between 0 and 1) can be defined in the following way. If mask value is m at a point, then the new pixel at that point will be : $m \times rp + (1-m) \times r$ where rp is the value at that point in the high pass filtered masked repair subimage R and r is the value at that point in the output of previous step 10A.

In further detail, when combining a new high pass filtered repair subimage with a high pass filtered repair subimage using a soft edged noise mask or a binary noise mask, the pixel value of each of the pixels of the new high pass filtered repair image is combined with the pixel value of each of the corresponding pixels of the high pass filtered repair subimage using the value of the soft noise mask or the binary noise mask, for each pixel, according to the following equation:

$$m \times rp + (1-m) \times r,$$

where m is the value of the soft edged noise mask,
rp is the pixel value of each of the pixels of the high pass filtered repair subimage (HR), and
r is the pixel value of each of the pixels of the new high pass filtered repair subimage.

At step 12A, the output of the previous step 11A and the low pass filtered masked repair subimage LR from step 6 are merged. Merging consists of simply adding these two images. In further detail, when merging the high pass filtered repair subimage (obtained by combining a new high pass filtered repair subimage with a high pass filtered repair subimage using a soft edged noise mask or a binary noise mask) with the low pass filtered repair subimage, the high pass filtered repair subimage is simply added to the low pass filtered repair subimage. The output of this merging is provided to the next step, step 13A.

At step 13A, if the value of any pixel output by step 12A is greater than 255, the value is reset to 255. Otherwise leave it untouched. This completes the core part of the method. As described about, this core part is to be performed a set number of times, since the user has already selected the number of times this is to be performed at the beginning, when the repair and sample subimages were being selected.

At step 14A, it is determined whether the required number of iterations of steps 6A–13A have been performed. If not, the process is returned to step 6A for another iteration. If so, then the process continues to step 15A as shown in FIG. 11.

At step 15A, the user determines whether the user is satisfied with the results as displayed on the display device 10. If so, the process is done. If not, the user returns to step 1A to repaint the noise mask over those areas that are visually unacceptable. In such a case, new repair and sample subimages may have to be selected.

To summarize the two new methods and apparatus for practicing the methods described here, we have described fast iterative algorithms for image noise removal. While most existing algorithms have worked solely in spatial or frequency domain, our algorithms work in both domains, making it possible to fully exploit the advantages from each domain. Although a few previous algorithms combine frequency and spatial domain information, they required the image to be band limited and required that the band limits be known. Our algorithms do not have this limitation.

Our dual-domain approach can (1) reconstruct many contiguous noisy pixels, (2) reconstruct textures even when they are large featured, (3) maintain sharpness, (4) maintain continuity of features (e.g., lines) across the noisy region. In addition the algorithm for removing noise from non-uniformly shaded images allows noise removal from images which contain objects that have slowly varying intensity changes in addition to the textures and prominent lines. These advantages make the methods very useful in many areas.

Important applications of this algorithm are in the field of film and video post production: for removing wires used in special effects scenes and for restoring old films and photographs that have become scratched.

In view of the above description, it will be appreciated by those skilled in the art that many variations, modifications and changes can be made to the present invention without departing from the spirit or scope of the present invention as defined by the claims appended hereto. All such variations, modifications and changes are fully contemplated by the present invention.

We claim:

1. A method of removing noise from image data, comprising the steps of:

defining an area of noise on the image data;

generating a noise mask to distinguish pixels inside the defined area of noise on the image data from pixels outside the area of noise on the image data;

defining repair image data including the defined area of noise;

defining sample image data which is similar to the repair image data;

creating from the noise mask a soft noise mask having a soft edge;

performing a frequency transform to the sample image data and to generate frequency transformed data of the sample image data;

performing the frequency transform to the repair image data to generate frequency transformed data of the repair image data;

performing an inverse transform of the frequency transformed data of the sample image data and the frequency transformed data of the repair image data to generate new repair image data; and generating new image data using the new repair image data, the repair image data and the soft noise mask.

2. The method of claim 1, further comprising the step of:

creating mask repair image data in accordance with data of the soft noise mask.

3. The method of claim 1, wherein the step of performing a frequency transform to the sample image data calculates a fast fourier transform of the sample image data to generate fast fourier transform data of the sample image data;

the step of performing a frequency transform to the repair image data calculates a fast fourier transform of the repair image data to generate fast fourier transform data of the repair image data;

the step of performing an inverse transform calculates an inverse fast fourier transform using the fast fourier transform data of the sample image data and the fast fourier transform data of the repair image data.

4. The method of claim 3, wherein the step of calculating a fast fourier transform of the sample image data generates at least magnitudes;

the step of calculating a fast fourier transform of the repair image data generates a phase and magnitudes; and the step of calculating an inverse fast fourier transform generates the new repair image data using a phase of the fast fourier transform data of the repair image data and one of the magnitudes of the fast fourier transform data of the sample image data and the magnitudes of the fast fourier transform data of the repair image data.

5. The method of claim 4, further comprising the step of:

comparing the magnitudes of the fast fourier transform data of the sample image data with magnitudes and minimum magnitudes of the fast fourier transform data of the repair image data, wherein the step of performing an inverse transform generates the new image data using a selected one of the minimum magnitudes and the phase of the fast fourier transform data of the repair image data.

6. The method of claim 5, wherein a magnitude of a DC component is selected as a magnitude of the fast fourier transform data of the repair image data.

7. The method of claim 1, further comprising the step of:

conforming the repair image data to a predetermined value.

8. The method of claim 1, further comprising the steps of:

receiving the image data;

displaying the image data; and storing the soft noise mask, the repair image data and the sample image data.

9. The method of claim 1, wherein the noise mask is binary data such that it is a value of 1 wherever there is no noise and a value of 0 wherever there is noise.

10. The method of claim 1, wherein the soft noise mask is soft edged data such that it is a value of 0 wherever there is noise, a value of between 0 and 1 near the edge of the noise and a value of 1 at at least a certain distance from the edge of the noise.

11. The method of claim 10, wherein the value of the noise mask outside a noise area defined by $1-\exp(-k \times d \times d)$, where k is a positive constant, and k is set to a large value where the noise mask is to have a broad soft edge, and k is set to a small value where the noise mask is to have a narrow soft edge, and where d is a distance from the edge of the noise.

12. The method of claim 1, wherein the steps of performing a frequency transform to the sample image data, performing the frequency transform to the repair image data, performing an inverse transform of the frequency transformed data and generating new image data are recursively performed to generate new image data.

13. A method of removing noise from image data, comprising the steps of:

defining an area of noise on the image data;

generating noise mask data to distinguish pixels inside the defined area of noise on the image data from pixels outside the area of noise on the image data;

defining sample image data which is similar to the repair image data;

filtering the sample image data to generate low pass filtered sample image data and high pass filtered sample image data;

performing a frequency transform to the high pass filtered sample image data to generate frequency transformed data of the high pass filtered sample image data;

filtering the repair image data to generate low pass filtered repair image data and high pass filtered repair image data;

performing the frequency transform to the high pass filtered repair image data to generate frequency transformed data of the high pass filtered repair image data;

performing an inverse transform of the frequency transform using the frequency transformed data of the high pass filtered sample image data and the frequency transformed data of the high pass filtered repair image data to generate new high pass filtered repair image data;

combining the low pass filtered repair image data and the low pass filtered sample image data to generate low pass filtered image data;

generating new high pass filtered image data using the new high pass filtered repair image data, the repair image data and the noise mask; and generating new image data using the new high pass filtered repair image data and the low pass filtered image data.

14. The method of claim 13, further comprising the step of:

creating from the noise mask a soft noise mask having a soft edge, wherein the step of generating new high pass filtered image data uses the new high pass filtered repair image data, the repair image data and the soft noise mask.

15. The method of claim 13, further comprising the step of:

creating mask repair image data in accordance with the noise mask and the repair image data.

16. The method of claim 14, further comprising the step of:

creating mask repair image data in accordance with the soft noise mask and the repair image data.

17. The method of claim 13, wherein the step of performing a frequency transform to the high pass filtered sample image data calculates a fast fourier transform of the high pass filtered sample image data to generate fast fourier transform data of the high pass filtered sample image data;

the step of performing the frequency transform to the high pass filtered repair image data calculates a fast fourier transform of the high pass filtered repair image data to generate fast fourier transform data of the high pass filtered repair image data; and the step of performing an inverse transform of the frequency transform calculates an inverse fast fourier transform using the fast fourier transform data of the high pass filtered sample image data and the fast fourier transform data of the high pass repair image data.

18. The method of claim 17, wherein the step of performing a frequency transform to the high pass filtered sample image data generates at least magnitudes of the fast fourier transform thereof;

the step of performing the frequency transform to the high pass filtered repair image data generates a phase and magnitudes of the fast fourier transform thereof; and the step of performing an inverse transform of the frequency transform generates the new high pass filtered repair image data using a phase of the fast fourier transform data of the high pass filtered repair image data and one of the magnitudes of the fast fourier transform data of the high pass filtered sample image data and the magnitudes of the fast fourier transform data of the high pass filtered repair image data.

19. The method of claim 18, further comprising the step of:

comparing the magnitudes of the fast fourier transform data of the sample image data with magnitudes and minimum magnitudes of the fast fourier transform data of the repair image data, wherein the step of performing an inverse transform generates the new image data using a selected one of the minimum magnitudes and the phase of the fast fourier transform data of the repair image data.

20. The method of claim 19, wherein a magnitude of a DC component is selected as the magnitude of the fast fourier transform data of the repair image data.

21. The method of claim 13, further comprising the step of:

conforming the new high pass filtered repair image data to a predetermined value.

22. The method of claim 13, wherein the noise mask is binary data such that such that it is a value of 1 wherever there is no noise and a value of 0 wherever there is noise.

23. The method of claim 14, wherein the soft noise mask is soft edged data such that it is a value of 0 wherever there is noise, a value of between 0 and 1 near the edge of the noise and a value of 1 at at least a certain distance from the edge of the noise.

24. The method of claim 23, wherein the value of the noise mask outside a noise area defined by 1−exp(−k×d×d), where k is a positive constant, and k is set to a large value where the noise mask is to have a broad soft edge, and k is set to a small value where the noise mask is to have a narrow soft edge, and where d is a distance from the edge of the noise.

25. The method of claim 13, wherein the steps of filtering the repair image data to generate low pass filtered repair image data and high pass filtered repair image data, performing the frequency transform to the high pass filtered repair image data to generate frequency transformed data of the high pass filtered repair image data, and performing an inverse transform of the frequency transform using the frequency transformed data of the high pass filtered sample image data and the frequency transformed data of the high pass filtered repair image data to generate new high pass filtered repair image data are performed recursively to generate the new image data.

26. An apparatus for removing noise from image data, comprising:

means for defining an area of noise on the image data;

means for generating a noise mask to distinguish pixels inside the defined area of noise on the image data from pixels outside the area of noise on the image data;

means for defining repair image data including the defined area of noise;

means for defining sample image data which is similar to the repair image data;

means for creating from the noise mask a soft noise mask having a soft edge;

means for performing a frequency transform to the sample image data and to generate frequency transformed data of the sample image data;

means for performing the frequency transform to the repair image data to generate frequency transformed data of the repair image data;

means for performing an inverse transform of the frequency transformed data of the sample image data and the frequency transformed data of the repair image data to generate new repair image data; and means for generating new image data using the new repair image data, the repair image data and the soft noise mask.

27. The apparatus of claim 26, further comprising:

means for creating mask repair image data in accordance with data of the soft noise mask.

28. The apparatus of claim 26, wherein the means for performing a frequency transform to the sample image data calculates a fast fourier transform of the sample image data to generate fast fourier transform data of the sample image data;

the means for performing a frequency transform to the repair image data calculates a fast fourier transform of the repair image data to generate fast fourier transform data of the repair image data; and the means for performing an inverse transform calculates an inverse fast fourier transform using the fast fourier transform data of the sample image data and the fast fourier transform data of the repair image data.

29. The apparatus of claim 28, wherein the means for calculating a fast fourier transform of the sample image data generates at least magnitudes;

the means for calculating a fast fourier transform of the repair image data generates a phase and magnitudes; and the means for calculating an inverse fast fourier transform generates the new repair image data using a phase of the fast fourier transform data of the repair image data and one of the magnitudes of the fast fourier transform data of the sample image data and the magnitudes of the fast fourier transform data of the repair image data.

30. The apparatus of claim 29, further comprising:

means for comparing the magnitudes of the fast fourier transform data of the sample image data with magnitudes and minimum magnitudes of the fast fourier transform data of the repair image data, wherein the means for performing an inverse transform generates the new image data using a selected one of the minimum magnitudes and the phase of the fast fourier transform data of the repair image data.

31. The apparatus of claim 30, wherein a magnitude of a DC component is selected as a magnitude of the fast fourier transform data of the repair image data.

32. The apparatus of claim 26, further comprising:

means for conforming the repair image data to a predetermined value.

33. The apparatus of claim 26, further comprising:

receiving the image data;

a display for displaying the image data; and a memory for storing the soft noise mask, the repair image data and the sample image data.

34. The apparatus of claim 26, wherein the noise mask is binary data such that it is a value of 1 wherever there is no noise and a value of 0 wherever there is noise.

35. The apparatus of claim 26, wherein the soft noise mask is soft edged data such that it is a value of 0 wherever there is noise, a value of between 0 and 1 near the edge of the noise and a value of 1 at at least a certain distance from the edge of the noise.

36. The apparatus of claim 35, wherein the value of the noise mask outside a noise area defined by 1−exp(−k×d×d), where k is a positive constant, and k is set to a large value where the noise mask is to have a broad soft edge, and k is set to a small value where the noise mask is to have a narrow soft edge, and where d is a distance from the edge of the noise.

37. The apparatus of claim 26, wherein the means for performing a frequency transform to the sample image data, the means for performing the frequency transform to the repair image data, the means for performing an inverse transform of the frequency transformed data and the means for generating new image data recursively operate to generate new image data.

38. An apparatus for removing noise from image data, comprising:

means for defining an area of noise on the image data;

means for generating noise mask data to distinguish pixels inside the defined area of noise on the image data from pixels outside the area of noise on the image data;

means for defining sample image data which is similar to the repair image data;

means for filtering the sample image data to generate low pass filtered sample image data and high pass filtered sample image data;

means for performing a frequency transform to the high pass filtered sample image data to generate frequency transformed data of the high pass filtered sample image data;

means for filtering the repair image data to generate low pass filtered repair image data and high pass filtered repair image data;

means for performing the frequency transform to the high pass filtered repair image data to generate frequency transformed data of the high pass filtered repair image data;

means for performing an inverse transform of the frequency transform using the frequency transformed data of the high pass filtered sample image data and the frequency transformed data of the high pass filtered repair image data to generate new high pass filtered repair image data;

means for combining the low pass filtered repair image data and the low pass filtered sample image data to generate low pass filtered image data;

means for generating new high pass filtered image data using the new high pass filtered repair image data, the repair image data and the noise mask; and means for generating new image data using the new high pass filtered repair image data and the low pass filtered image data.

39. The apparatus of claim 38, further comprising:

means for creating from the noise mask a soft noise mask having a soft edge, wherein the means for generating new high pass filtered image data uses the new high pass filtered repair image data, the repair image data and the soft noise mask.

40. The apparatus of claim 38, further comprising:

means for creating mask repair image data in accordance with the noise mask and the repair image data.

41. The apparatus of claim 39, further comprising the step of:

creating mask repair image data in accordance with the soft noise mask and the repair image data.

42. The apparatus of claim 38, wherein the means for performing a frequency transform to the high pass filtered sample image data calculates a fast fourier transform of the high pass filtered sample image data to generate fast fourier transform data of the high pass filtered sample image data;

the means for performing the frequency transform to the high pass filtered repair image data calculates a fast fourier transform of the high pass filtered repair image data to generate fast fourier transform data of the high pass filtered repair image data; and the means for performing an inverse transform of the frequency transform calculates an inverse fast fourier transform using the fast fourier transform data of the high pass filtered sample image data and the fast fourier transform data of the high pass repair image data.

43. The apparatus of claim 42, wherein the means for performing a frequency transform to the high pass filtered sample image data generates at least magnitudes of the fast fourier transform thereof;

the means for performing the frequency transform to the high pass filtered repair image data generates a phase and magnitudes of the fast fourier transform thereof; and the means for performing an inverse transform of the frequency transform generates the new high pass filtered repair image data using a phase of the fast fourier transform data of the high pass filtered repair image data and one of the magnitudes of the fast fourier transform data of the high pass filtered sample image data and the magnitudes of the fast fourier transform data of the high pass filtered repair image data.

44. The apparatus of claim 43, further comprising:

means for comparing the magnitudes of the fast fourier transform data of the sample image data with magnitudes and minimum magnitudes of the fast fourier transform data of the repair image data, wherein the means for performing an inverse transform generates the new image data using a selected one of the minimum magnitudes and the phase of the fast fourier transform data of the repair image data.

45. The apparatus of claim 44, wherein a magnitude of a DC component is selected as the magnitude of the fast fourier transform data of the repair image data.

46. The apparatus of claim 38, further comprising:

means for conforming the new high pass filtered repair image data to a predetermined value.

47. The apparatus of claim 38, wherein the noise mask is binary data such that such that it is a value of 1 wherever there is no noise and a value of 0 wherever there is noise.

48. The apparatus of claim 39, wherein the soft noise mask is soft edged data such that it is a value of 0 wherever there is noise, a value of between 0 and 1 near the edge of the noise and a value of 1 at at least a certain distance from the edge of the noise.

49. The apparatus of claim 48, wherein the value of the noise mask outside a noise area defined by $1-\exp(-k \times d \times d)$, where k is a positive constant, and k is set to a large value where the noise mask is to have a broad soft edge, and k is set to a small value where the noise mask is to have a narrow soft edge, and where d is a distance from the edge of the noise.

50. The apparatus of claim 38, wherein the means for filtering the repair image data to generate low pass filtered repair image data and high pass filtered repair image data, the means for performing the frequency transform to the high pass filtered repair image data to generate frequency transformed data of the high pass filtered repair image data, and the means for performing an inverse transform of the frequency transform using the frequency transformed data of the high pass filtered sample image data and the frequency transformed data of the high pass filtered repair image data to generate new high pass filtered repair image data operate recursively to generate the new image data.

51. A program storage device readable by a machine, tangibly embodying a program of instructions executable by the machine to perform method steps for removing noise from image data, the method steps comprising:

defining an area of noise on the image data;

generating a noise mask to distinguish pixels inside the defined area of noise on the image data from pixels outside the area of noise on the image data;

defining repair image data including the defined area of noise;

defining sample image data which is similar to the repair image data;

creating from the noise mask a soft noise mask having a soft edge;

performing a frequency transform to the sample image data and to generate frequency transformed data of the sample image data;

performing the frequency transform to the repair image data to generate frequency transformed data of the repair image data;

performing an inverse transform of the frequency transformed data of the sample image data and the frequency transformed data of the repair image data to generate new repair image data; and generating new image data using the new repair image data, the repair image data and the soft noise mask.

52. The program storage device of claim 51, wherein the method further comprises the step of:

creating mask repair image data in accordance with data of the soft noise mask.

53. The program storage device of claim 51, wherein the step of performing a frequency transform to the sample image data calculates a fast fourier transform of the sample image data to generate fast fourier transform data of the sample image data;

the step of performing a frequency transform to the repair image data calculates a fast fourier transform of the repair image data to generate fast fourier transform data of the repair image data;

the step of performing an inverse transform calculates an inverse fast fourier transform using the fast fourier transform data of the sample image data and the fast fourier transform data of the repair image data.

54. The program storage device of claim 53, wherein the step of calculating a fast fourier transform of the sample image data generates at least magnitudes;

the step of calculating a fast fourier transform of the repair image data generates a phase and magnitudes; and the step of calculating an inverse fast fourier transform generates the new repair image data using a phase of the fast fourier transform data of the repair image data and one of the magnitudes of the fast fourier transform data of the sample image data and the magnitudes of the fast fourier transform data of the repair image data.

55. The program storage device of claim 54, wherein the method further comprises the step of:

comparing the magnitudes of the fast fourier transform data of the sample image data with magnitudes and minimum magnitudes of the fast fourier transform data of the repair image data, wherein the step of performing an inverse transform generates the new image data using a selected one of the minimum magnitudes and the phase of the fast fourier transform data of the repair image data.

56. The program storage device of claim 51, wherein a magnitude of a DC component is selected as a magnitude of the fast fourier transform data of the repair image data.

57. The program storage device of claim 51, wherein the method further comprises the step of:

conforming the repair image data to a predetermined value.

58. The program storage device of claim 51, wherein the method further comprises the steps of:

receiving the image data;

displaying the image data; and storing the soft noise mask, the repair image data and the sample image data.

59. The program storage device of claim 51, wherein the noise mask is binary data such that it is a value of 1 wherever there is no noise and a value of 0 wherever there is noise.

60. The program storage device of claim 51, wherein the soft noise mask is soft edged data such that it is a value of 0 wherever there is noise, a value of between 0 and 1 near the edge of the noise and a value of 1 at at least a certain distance from the edge of the noise.

61. The program storage device of claim 60, wherein the value of the noise mask outside a noise area defined by $1-\exp(-k \times d \times d)$, where k is a positive constant, and k is set to a large value where the noise mask is to have a broad soft edge, and k is set to a small value where the noise mask is to have a narrow soft edge, and where d is a distance from the edge of the noise.

62. The program storage device of claim 51, wherein the steps of performing a frequency transform to the sample image data, performing the frequency transform to the repair image data, performing an inverse transform of the frequency transformed data and generating new image data are recursively performed to generate new image data.

63. A program storage device readable by a machine, tangibly embodying a program of instructions executable by the machine to perform method steps for removing noise from image data, the method steps comprising:

defining an area of noise on the image data;

generating noise mask data to distinguish pixels inside the defined area of noise on the image data from pixels outside the area of noise on the image data;

defining sample image data which is similar to the repair image data;

filtering the sample image data to generate low pass filtered sample image data and high pass filtered sample image data;

performing a frequency transform to the high pass filtered sample image data to generate frequency transformed data of the high pass filtered sample image data;

filtering the repair image data to generate low pass filtered repair image data and high pass filtered repair image data;

performing the frequency transform to the high pass filtered repair image data to generate frequency transformed data of the high pass filtered repair image data;

performing an inverse transform of the frequency transform using the frequency transformed data of the high pass filtered sample image data and the frequency transformed data of the high pass filtered repair image data to generate new high pass filtered repair image data;

combining the low pass filtered repair image data and the low pass filtered sample image data to generate low pass filtered image data;

generating new high pass filtered image data using the new high pass filtered repair image data, the repair image data and the noise mask; and generating new image data using the new high pass filtered repair image data and the low pass filtered image data.

64. The program storage device of claim 63, wherein the method further comprises the step of:

creating from the noise mask a soft noise mask having a soft edge, wherein the step of generating new high pass filtered image data uses the new high pass filtered repair image data, the repair image data and the soft noise mask.

65. The program storage device of claim 63 wherein the method further comprises the step of:

creating mask repair image data in accordance with the noise mask and the repair image data.

66. The program storage device of claim 64, wherein the method further comprises the step of:

creating mask repair image data in accordance with the soft noise mask and the repair image data.

67. The program storage device of claim 63, wherein the step of performing a frequency transform to the high pass filtered sample image data calculates a fast fourier transform of the high pass filtered sample image data to generate fast fourier transform data of the high pass filtered sample image data;

the step of performing the frequency transform to the high pass filtered repair image data calculates a fast fourier transform of the high pass filtered repair image data to generate fast fourier transform data of the high pass filtered repair image data; and the step of performing an inverse transform of the frequency transform calculates an inverse fast fourier transform using the fast fourier transform data of the high pass filtered sample image data and the fast fourier transform data of the high pass repair image data.

68. The program storage device of claim 67, wherein the step of performing a frequency transform to the high pass filtered sample image data generates at least magnitudes of the fast fourier transform thereof;

the step of performing the frequency transform to the high pass filtered repair image data generates a phase and magnitudes of the fast fourier transform thereof; and the step of performing an inverse transform of the frequency transform generates the new high pass filtered repair image data using a phase of the fast fourier transform data of the high pass filtered repair image data and one of the magnitudes of the fast fourier transform data of the high pass filtered sample image data and the magnitudes of the fast fourier transform data of the high pass filtered repair image data.

69. The program storage device of claim 68, wherein the method further comprises the step of:

comparing the magnitudes of the fast fourier transform data of the sample image data with magnitudes and minimum magnitudes of the fast fourier transform data of the repair image data, wherein the step of performing an inverse transform generates the new image data using a selected one of the minimum magnitudes and the phase of the fast fourier transform data of the repair image data.

70. The program storage device of claim 69, wherein a magnitude of a DC component is selected as the magnitude of the fast fourier transform data of the repair image data.

71. The program storage device of claim 63, wherein the method further comprises the step of:

conforming the new high pass filtered repair image data to a predetermined value.

72. The program storage device of claim 63, wherein the noise mask is binary data such that such that it is a value of 1 wherever there is no noise and a value of 0 wherever there is noise.

73. The program storage device of claim 64, wherein the soft noise mask is soft edged data such that it is a value of 0 wherever there is noise, a value of between 0 and 1 near the edge of the noise and a value of 1 at at least a certain distance from the edge of the noise.

74. The program storage device of claim 73, wherein the value of the noise mask outside a noise area defined by $1-\exp(-k \times d \times d)$, where k is a positive constant, and k is set to a large value where the noise mask is to have a broad soft edge, and k is set to a small value where the noise mask is to have a narrow soft edge, and where d is a distance from the edge of the noise.

75. The program storage device of claim 60, wherein the steps of filtering the repair image data to generate low pass filtered repair image data and high pass filtered repair image data, performing the frequency transform to the high pass filtered repair image data to generate frequency transformed data of the high pass filtered repair image data, and performing an inverse transform of the frequency transform using the frequency transformed data of the high pass filtered sample image data and the frequency transformed data of the high pass filtered repair image data to generate new high pass filtered repair image data are performed recursively to generate the new image data.

76. A recording medium having digital data recorded thereon, the recording medium being prepared by the steps of:

defining an area of noise on image data, the image data representative of an image;

generating a noise mask to distinguish pixels inside the defined area of noise on the image data from pixels outside the area of noise on the image data;

defining repair image data including the defined area of noise;

defining sample image data which is similar to the repair image data;

creating from the noise mask a soft noise mask having a soft edge;

performing a frequency transform to the sample image data and to generate frequency transformed data of the sample image data;

performing the frequency transform to the repair image data to generate frequency transformed data of the repair image data;

performing an inverse transform of the frequency transformed data of the sample image data and the frequency transformed data of the repair image data to generate new repair image data;

generating new image data using the new repair image data, the repair image data and the soft noise mask; and recording the new image data on the recording medium.

77. The recording medium of claim 76, further comprising the step of:

creating mask repair image data in accordance with data of the soft noise mask.

78. The recording medium of claim 76 wherein the step of performing a frequency transform to the sample image data calculates a fast fourier transform of the sample image data to generate fast fourier transform data of the sample image data;

the step of performing a frequency transform to the repair image data calculates a fast fourier transform of the repair image data to generate fast fourier transform data of the repair image data;

the step of performing an inverse transform calculates an inverse fast fourier transform using the fast fourier transform data of the sample image data and the fast fourier transform data of the repair image data.

79. The recording medium of claim 78, wherein the step of calculating a fast fourier transform of the sample image data generates at least magnitudes;

the step of calculating a fast fourier transform of the repair image data generates a phase and magnitudes; and the step of calculating an inverse fast fourier transform generates the new repair image data using a phase of the fast fourier transform data of the repair image data and one of the magnitudes of the fast fourier transform data of the sample image data and the magnitudes of the fast fourier transform data of the repair image data.

80. The recording medium of claim 79, further comprising the step of:

comparing the magnitudes of the fast fourier transform data of the sample image data with magnitudes and minimum magnitudes of the fast fourier transform data of the repair image data, wherein the step of performing an inverse transform generates the new image data using a selected one of the minimum magnitudes and the phase of the fast fourier transform data of the repair image data.

81. The recording medium of claim 80, wherein a magnitude of a DC component is selected as a magnitude of the fast fourier transform data of the repair image data.

82. The recording medium of claim 76, further comprising the step of:

conforming the repair image data to a predetermined value.

83. The recording medium of claim 76, further comprising the steps of:

receiving the image data;

displaying the image data; and storing the soft noise mask, the repair image data and the sample image data.

84. The recording medium of claim 76, wherein the noise mask is binary data such that it is a value of 1 wherever there is no noise and a value of 0 wherever there is noise.

85. The recording medium of claim 76, wherein the soft noise mask is soft edged data such that it is a value of 0 wherever there is noise, a value of between 0 and 1 near the edge of the noise and a value of 1 at at least a certain distance from the edge of the noise.

86. The recording medium of claim 85, wherein the value of the noise mask outside a noise area defined by 1−exp(−k×d×d), where k is a positive constant, and k is set to a large value where the noise mask is to have a broad soft edge, and k is set to a small value where the noise mask is to have a narrow soft edge, and where d is a distance from the edge of the noise.

87. The recording medium of claim 76, wherein the steps of performing a frequency transform to the sample image data, performing the frequency transform to the repair image data, performing an inverse transform of the frequency transformed data and generating new image data are recursively performed to generate new image data.

88. A recording medium having digital data recorded thereon, the recording medium being prepared by the steps of:
defining an area of noise in an image represented by image data, the image data representative of an image;
generating noise mask data to distinguish pixels inside the defined area of noise on the image data from pixels outside the area of noise on the image data;
defining sample image data which is similar to the repair image data;
filtering the sample image data to generate low pass filtered sample image data and high pass filtered sample image data;
performing a frequency transform to the high pass filtered sample image data to generate frequency transformed data of the high pass filtered sample image data;
filtering the repair image data to generate low pass filtered repair image data and high pass filtered repair image data;
performing the frequency transform to the high pass filtered repair image data to generate frequency transformed data of the high pass filtered repair image data;
performing an inverse transform of the frequency transform using the frequency transformed data of the high pass filtered sample image data and the frequency transformed data of the high pass filtered repair image data to generate new high pass filtered repair image data;
combining the low pass filtered repair image data and the low pass filtered sample image data to generate low pass filtered image data;
generating new high pass filtered image data using the new high pass filtered repair image data, the repair image data and the noise mask;
generating new image data using the new high pass filtered repair image data and the low pass filtered image data; and
recording the new image data on the recording medium.

89. The recording medium of claim 88, further comprising the step of:
creating from the noise mask a soft noise mask having a soft edge,
wherein the step of generating new high pass filtered image data uses the new high pass filtered repair image data, the repair image data and the soft noise mask.

90. The recording medium of claim 88, further comprising the step of:
creating mask repair image data in accordance with the noise mask and the repair image data.

91. The recording medium of claim 89, further comprising the step of:
creating mask repair image data in accordance with the soft noise mask and the repair image data.

92. The recording medium of claim 88, wherein the step of performing a frequency transform to the high pass filtered sample image data calculates a fast fourier transform of the high pass filtered sample image data to generate fast fourier transform data of the high pass filtered sample image data;
the step of performing the frequency transform to the high pass filtered repair image data calculates a fast fourier transform of the high pass filtered repair image data to generate fast fourier transform data of the high pass filtered repair image data; and
the step of performing an inverse transform of the frequency transform calculates an inverse fast fourier transform using the fast fourier transform data of the high pass filtered sample image data and the fast fourier transform data of the high pass repair image data.

93. The recording medium of claim 92, wherein the step of performing a frequency transform to the high pass filtered sample image data generates at least magnitudes of the fast fourier transform thereof;
the step of performing the frequency transform to the high pass filtered repair image data generates a phase and magnitudes of the fast fourier transform thereof; and
the step of performing an inverse transform of the frequency transform generates the new high pass filtered repair image data using a phase of the fast fourier transform data of the high pass filtered repair image data and one of the magnitudes of the fast fourier transform data of the high pass filtered sample image data and the magnitudes of the fast fourier transform data of the high pass filtered repair image data.

94. The recording medium of claim 93, further comprising the step of:
comparing the magnitudes of the fast fourier transform data of the sample image data with magnitudes and minimum magnitudes of the fast fourier transform data of the repair image data,
wherein the step of performing an inverse transform generates the new image data using a selected one of the minimum magnitudes and the phase of the fast fourier transform data of the repair image data.

95. The recording medium of claim 94, wherein a magnitude of a DC component is selected as the magnitude of the fast fourier transform data of the repair image data.

96. The recording medium of claim 88, further comprising the step of:
conforming the new high pass filtered repair image data to a predetermined value.

97. The recording medium of claim 88, wherein the noise mask is binary data such that such that it is a value of 1 wherever there is no noise and a value of 0 wherever there is noise.

98. The recording medium of claim 89, wherein the soft noise mask is soft edged data such that it is a value of 0 wherever there is noise, a value of between 0 and 1 near the edge of the noise and a value of 1 at at least a certain distance from the edge of the noise.

99. The recording medium of claim 98, wherein the value of the noise mask outside a noise area defined by 1−exp(−k×d×d), where k is a positive constant, and k is set to a large value where the noise mask is to have a broad soft edge, and k is set to a small value where the noise mask is to have a narrow soft edge, and where d is a distance from the edge of the noise.

100. The recording medium of claim 88, wherein the steps of filtering the repair image data to generate low pass filtered repair image data and high pass filtered repair image data, performing the frequency transform to the high pass filtered repair image data to generate frequency transformed data of the high pass filtered repair image data, and performing an inverse transform of the frequency transform using the frequency transformed data of the high pass filtered sample image data and the frequency transformed data of the high pass filtered repair image data to generate new high pass filtered repair image data are performed recursively to generate the new image data.

* * * * *

UNITED STATES PATENT AND TRADEMARK OFFICE
CERTIFICATE OF CORRECTION

PATENT NO.: 5,892,853
DATED: April 6, 1999
INVENTOR(S): ANIL HIRANI ET AL.

It is certified that errors appear in the above-identified patent and that said Letters Patent is hereby corrected as shown below:

In claim 22, col. 22, line 16, delete the second occurrence of "such that";
In claim 47, col. 25, line 47, delete the second occurrence of "such that";
In claim 72, col. 29, line 18, delete the second occurrence of "such that";
In claim 97, col. 32, line 55, delete the second occurrence of "such that".

Signed and Sealed this

Twenty-fifth Day of January, 2000

Attest:

Attesting Officer

Acting Commissioner of Patents and Trademarks